(12) United States Patent
Perg et al.

(10) Patent No.: US 7,702,550 B2
(45) Date of Patent: Apr. 20, 2010

(54) MULTIPLE COMPUTER SYSTEM SUPPORTING A PRIVATE CONSTANT-DOLLAR FINANCIAL PRODUCT

(75) Inventors: Wayne F Perg, Sierra Vista, AZ (US); T. Brian Gidley, Tower Lakes, IL (US); Anthony F. Herbst, El Paso, TX (US)

(73) Assignee: New Market Solutions, LLC, Sierra Vista, AZ (US)

( * ) Notice: Subject to any disclaimer, the term of this patent is extended or adjusted under 35 U.S.C. 154(b) by 1455 days.

(21) Appl. No.: 10/885,442

(22) Filed: Jul. 6, 2004

(65) Prior Publication Data

US 2005/0080698 A1 Apr. 14, 2005

Related U.S. Application Data

(63) Continuation-in-part of application No. 09/283,102, filed on Mar. 31, 1999, now Pat. No. 6,760,710.

(51) Int. Cl.
*G06Q 40/00* (2006.01)
(52) U.S. Cl. .................. 705/35; 705/36 R; 705/37; 705/38
(58) Field of Classification Search .............. 705/35–40
See application file for complete search history.

(56) References Cited

U.S. PATENT DOCUMENTS

| | | | | |
|---|---|---|---|---|
| 5,237,500 A * | 8/1993 | Perg et al. | ...... | 705/35 |
| 5,668,879 A | 9/1997 | Ibaraki et al. | ...... | 380/41 |
| 5,668,897 A * | 9/1997 | Stolfo | ...... | 382/283 |
| 5,742,775 A * | 4/1998 | King | ...... | 705/38 |
| 5,884,283 A * | 3/1999 | Manos | ...... | 705/36 R |
| 6,052,673 A * | 4/2000 | Leon et al. | ...... | 705/38 |
| 6,760,710 B1 * | 7/2004 | Perg | ...... | 705/38 |
| 6,985,880 B1 * | 1/2006 | Hodgdon et al. | ...... | 705/36 R |
| 2003/0120570 A1 * | 6/2003 | Dellinger et al. | ...... | 705/35 |
| 2004/0225599 A1 * | 11/2004 | Burgersdijk | ...... | 705/38 |
| 2005/0080698 A1 * | 4/2005 | Perg et al. | ...... | 705/35 |
| 2006/0074787 A1 * | 4/2006 | Perg et al. | ...... | 705/35 |
| 2006/0212379 A1 * | 9/2006 | Perg et al. | ...... | 705/35 |

OTHER PUBLICATIONS

Feldman, A., Leslie Haggin, Laura Lallos, Teresa Tritch, et al. The Ultimate Guide to Retirement: Your Retirement Questions. Money. New York: Jul. 2000. vol. 29, ISS. 7; p. 72, 17 pgs.*
International Search Report for PCT/US2005/023864, filed Jul. 5, 2005. pp. 1-2.
Written Opinion of the International Searching Authority for PCT/US2005/023864, filed Jul. 5, 2005. pp. 1-3.

* cited by examiner

*Primary Examiner*—Stefanos Karmis
(74) *Attorney, Agent, or Firm*—Peter K. Trzyna, Esq.

(57) ABSTRACT

Computers and data processing systems, especially pertaining to a constant-dollar financial product. Exemplary implementations include, a machine, a method for use and method for making, and corresponding products produced thereby, as well as data structures, computer-readable media tangibly embodying program instructions, manufactures, and necessary intermediates of the foregoing. Respectively, computers can use private, constant-dollar financial product data and nominal dollar data corresponding thereto, and communicate so as to cooperate (e.g., including transmit, receive) in computing a constant dollar to nominal dollar conversion for a financial product, the computers generating different output.

150 Claims, 10 Drawing Sheets

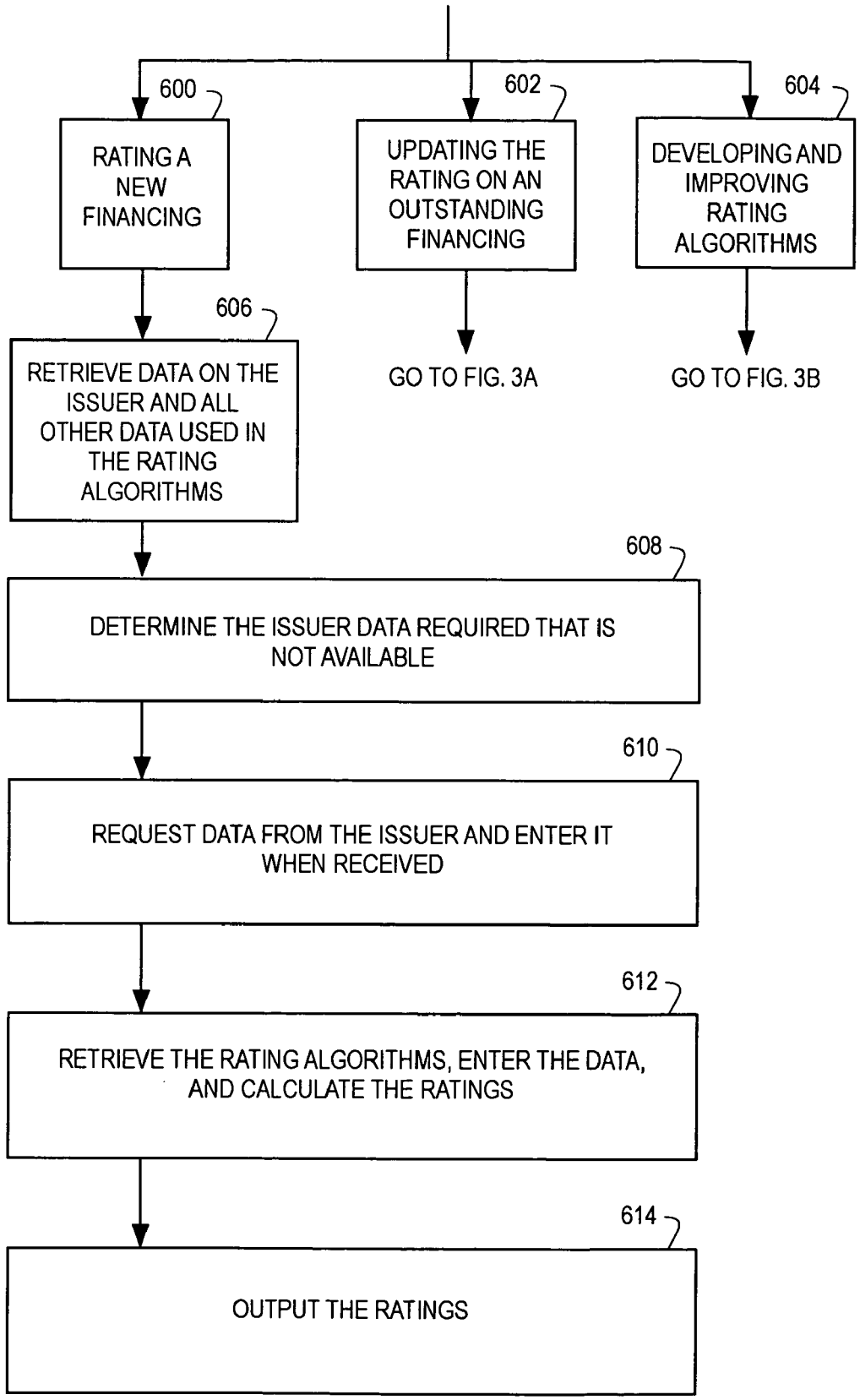

MULTIPLE COMPUTER SYSTEM SUPPORTING A PRIVATE CONSTANT-DOLLAR FINANCIAL PRODUCT

I. PRIORITY

The present patent application is a continuation-in-part of U.S. patent application Ser. No. 09/283,102, issued Jul. 6, 2004, as U.S. Pat. No. 6,760,710, incorporated by reference.

II. TECHNICAL FIELD

The technical field is computers and data processing systems, as illustrated more particularly herein. Exemplary embodiments include, depending on the implementation, apparatus, a method for use and method for making, and corresponding products produced thereby, as well as data structures, computer-readable media tangibly embodying program instructions, manufactures, and necessary intermediates of the foregoing.

III. BRIEF DESCRIPTION OF THE DRAWINGS

Figure 1:
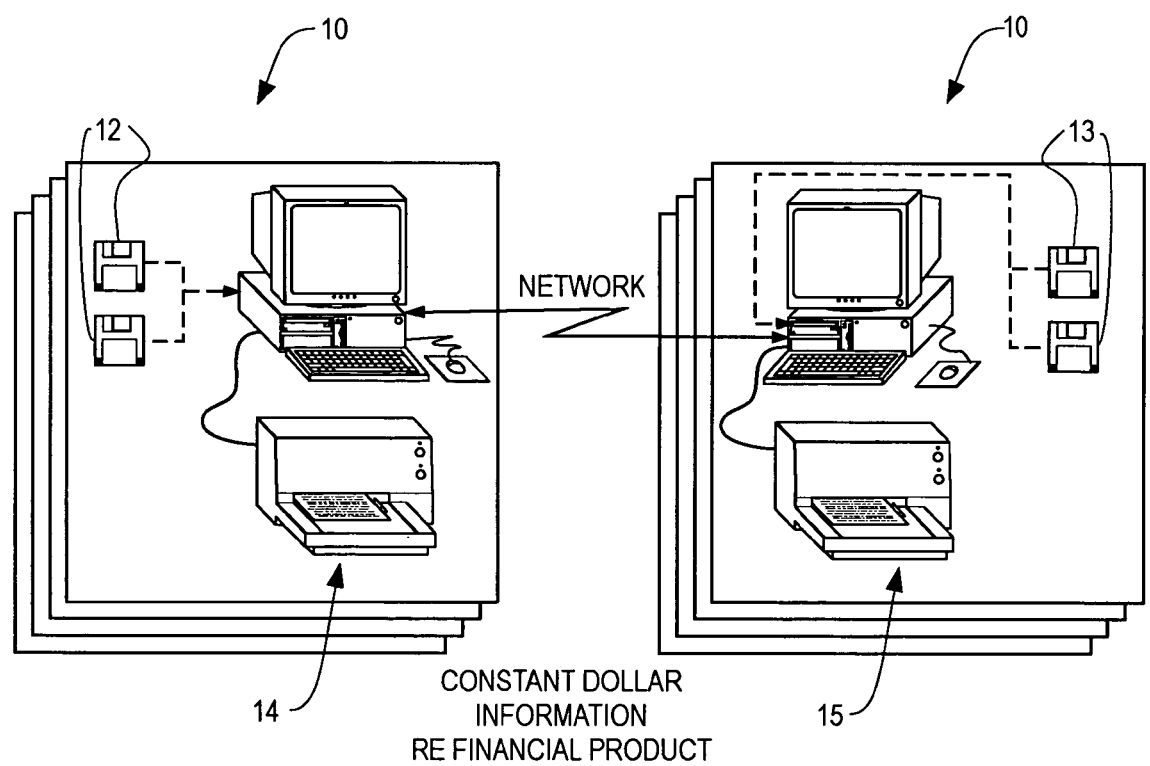
Figure 1A:
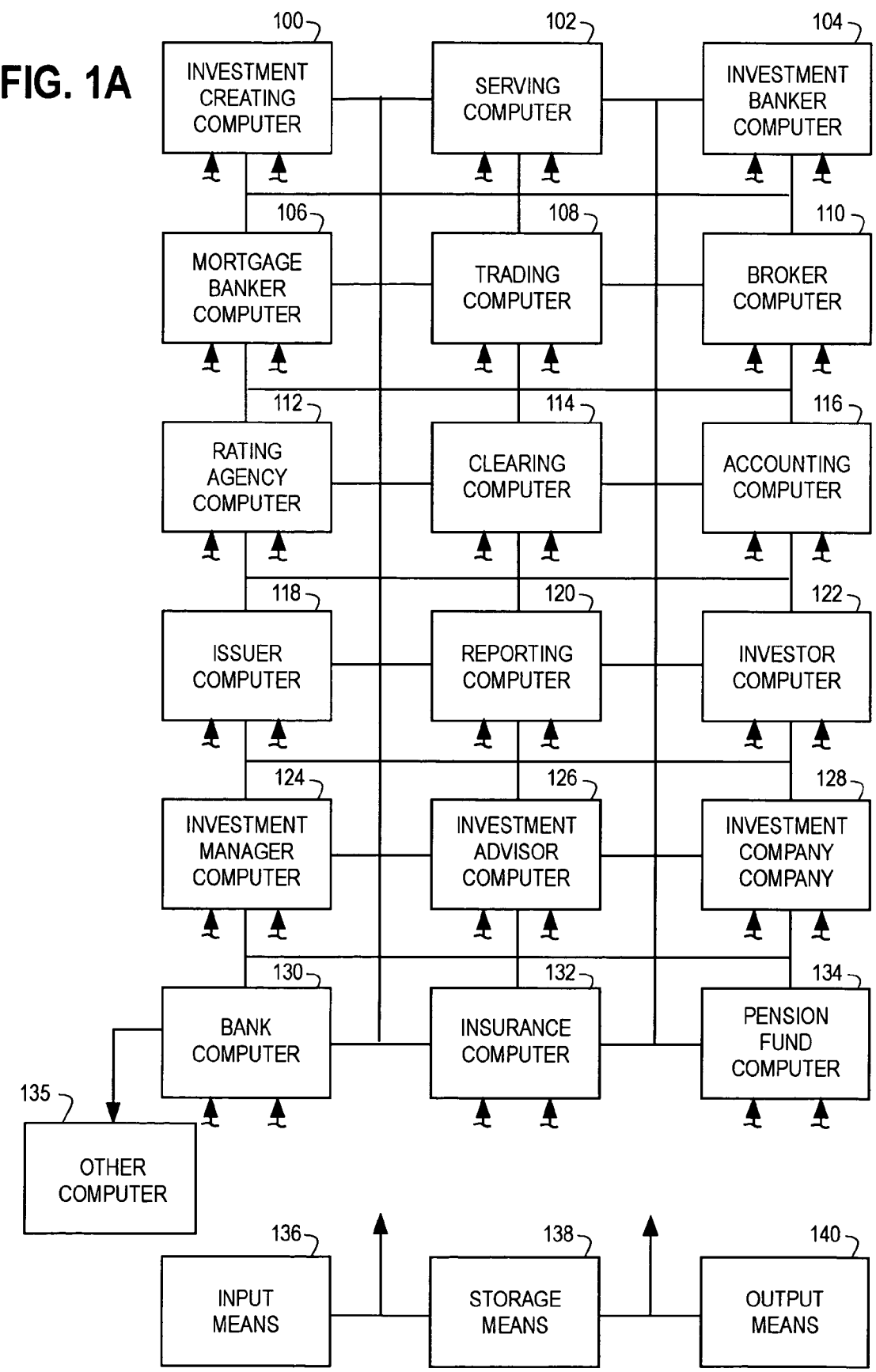
Figure 2:
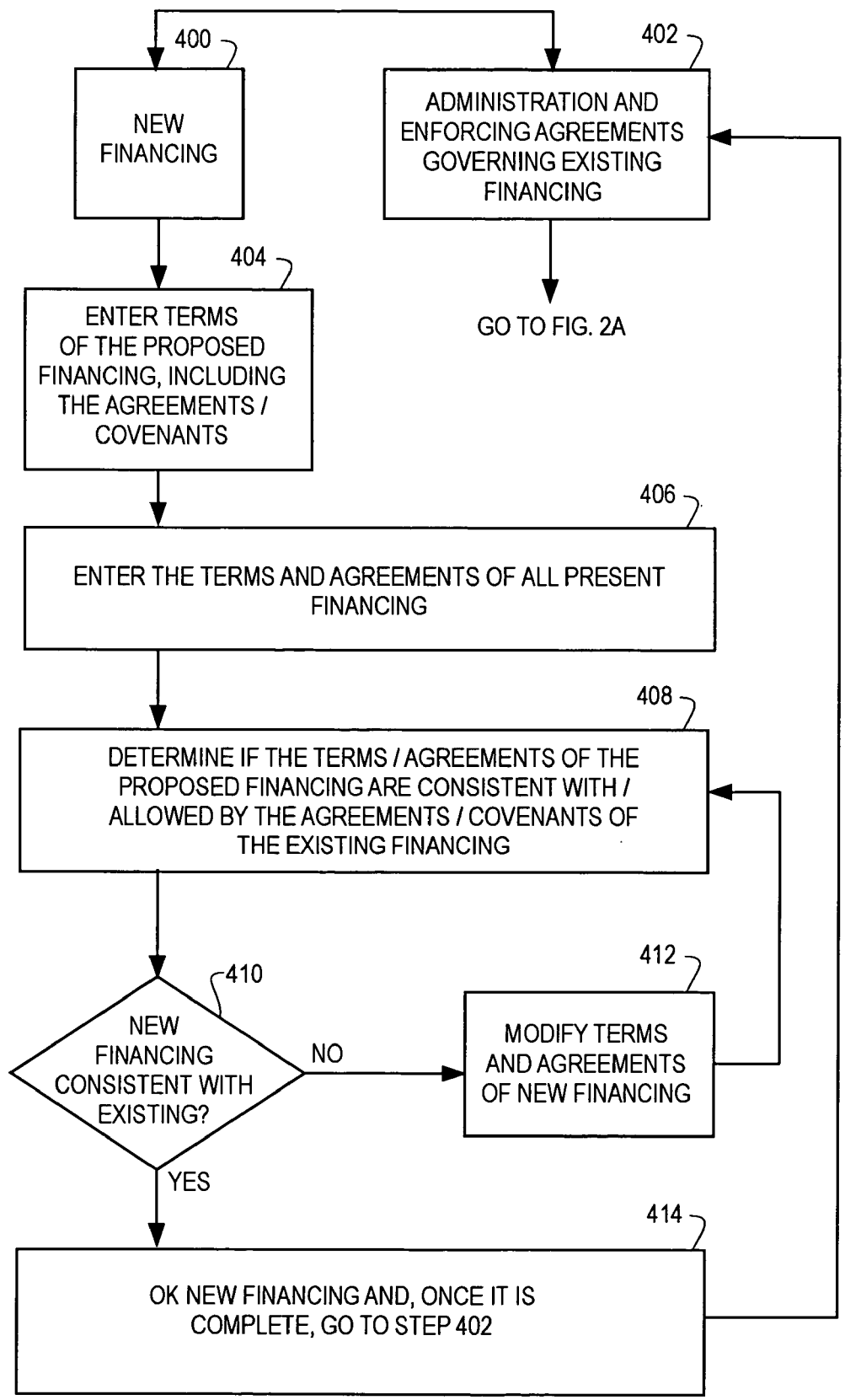
Figure 2A:
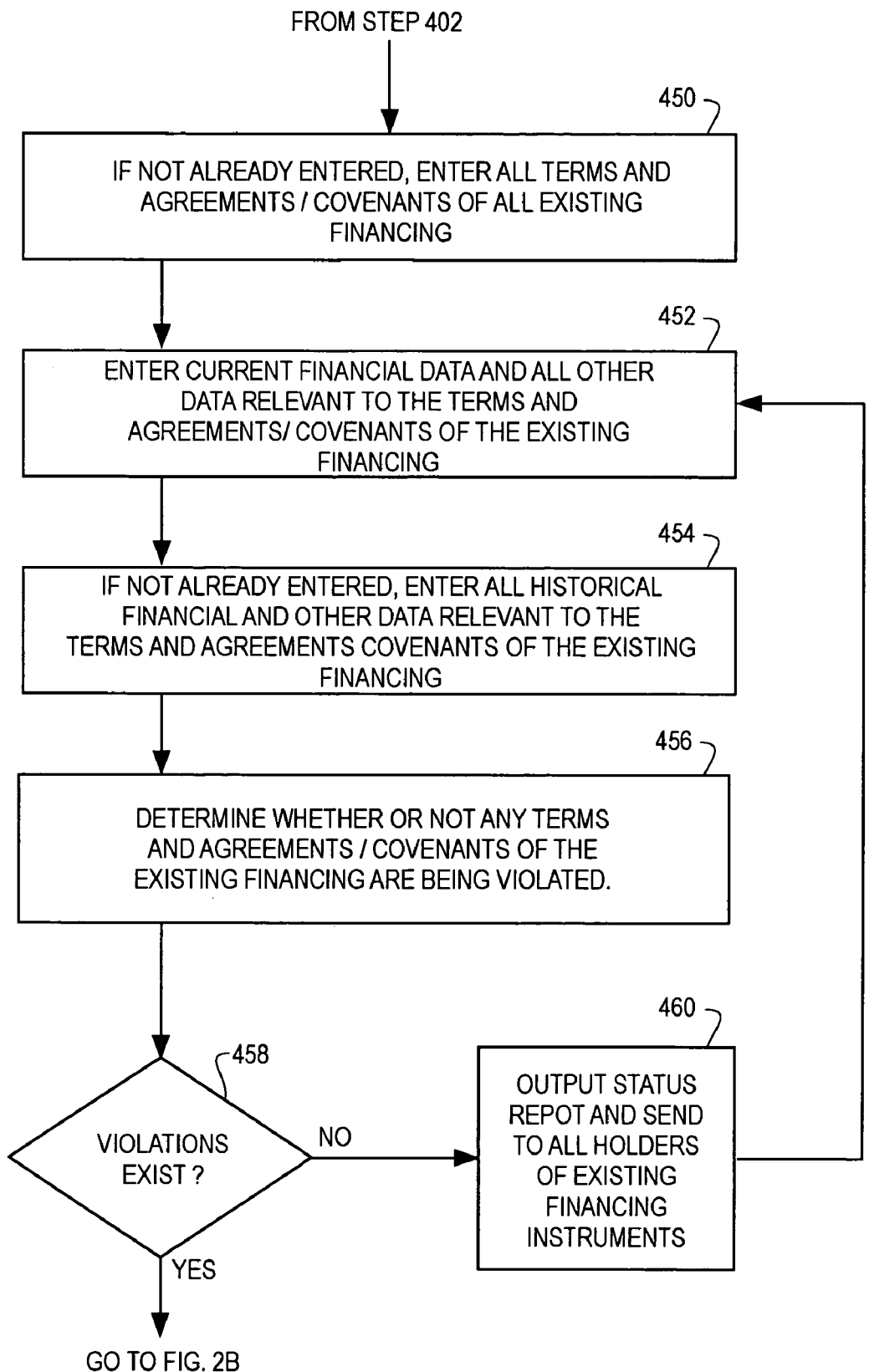
Figure 2B:
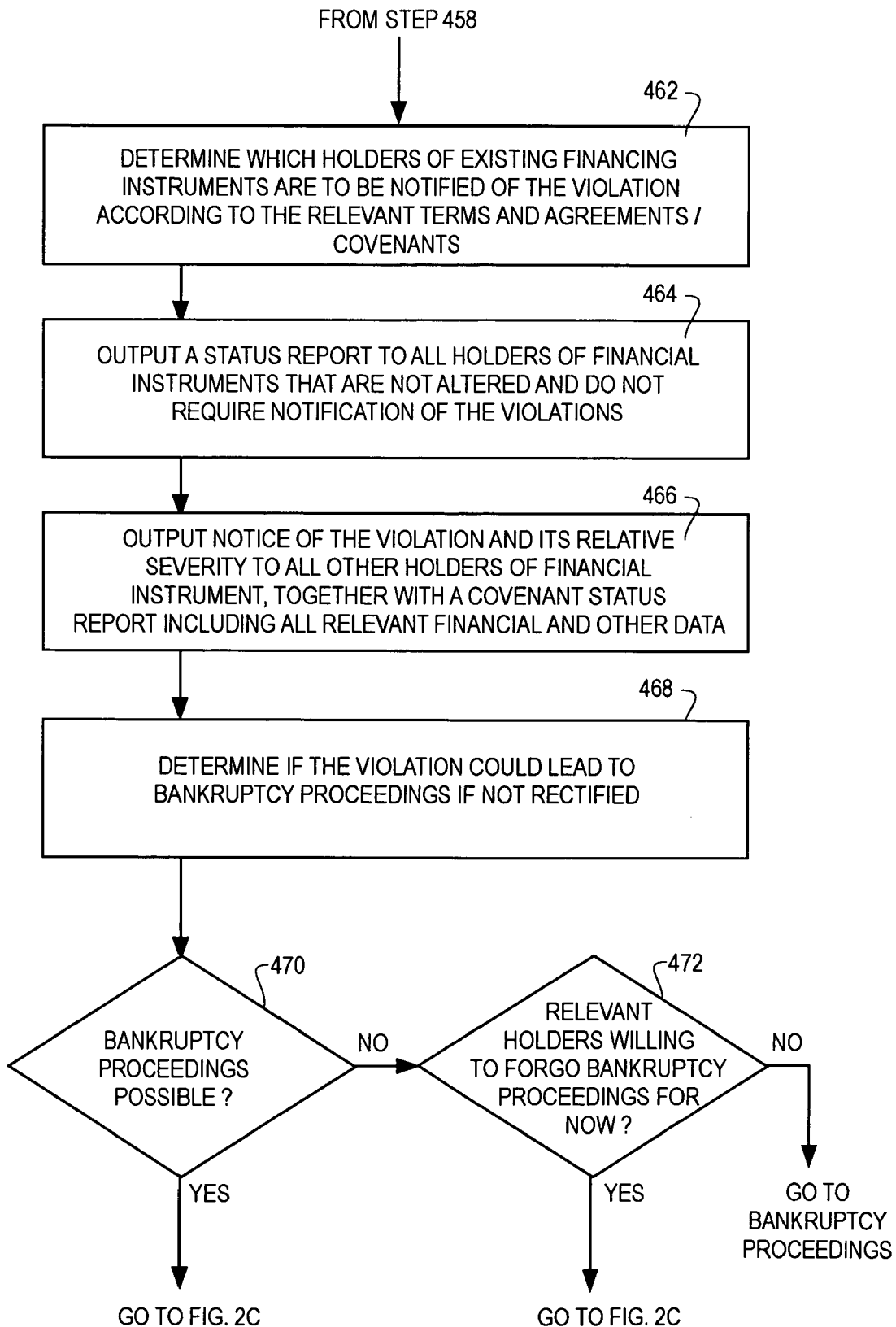
Figure 2C:
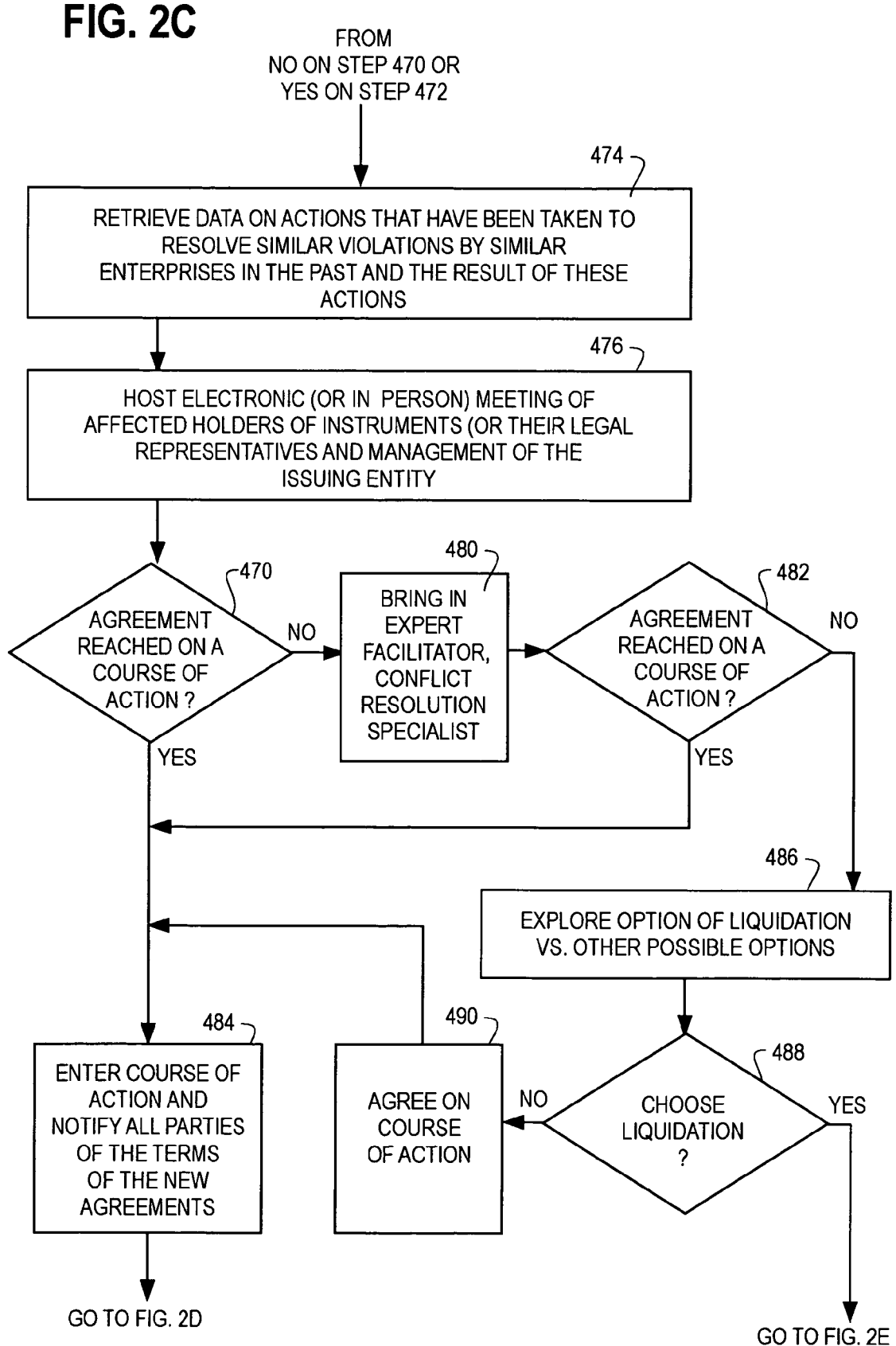
Figure 2D:
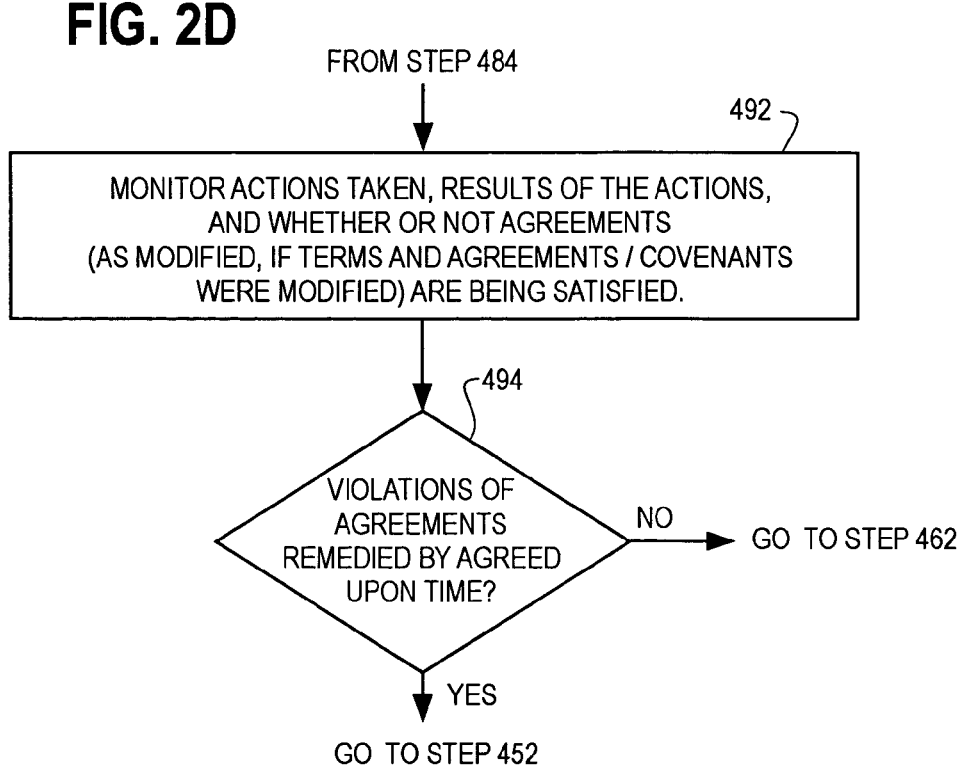
Figure 2E:
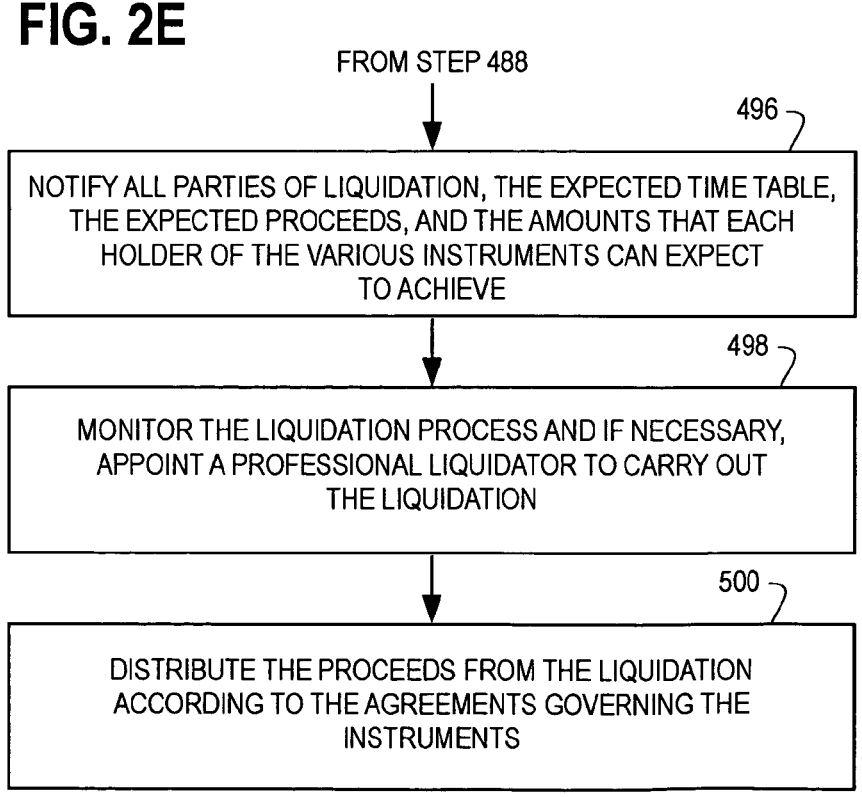
Figure 3A:
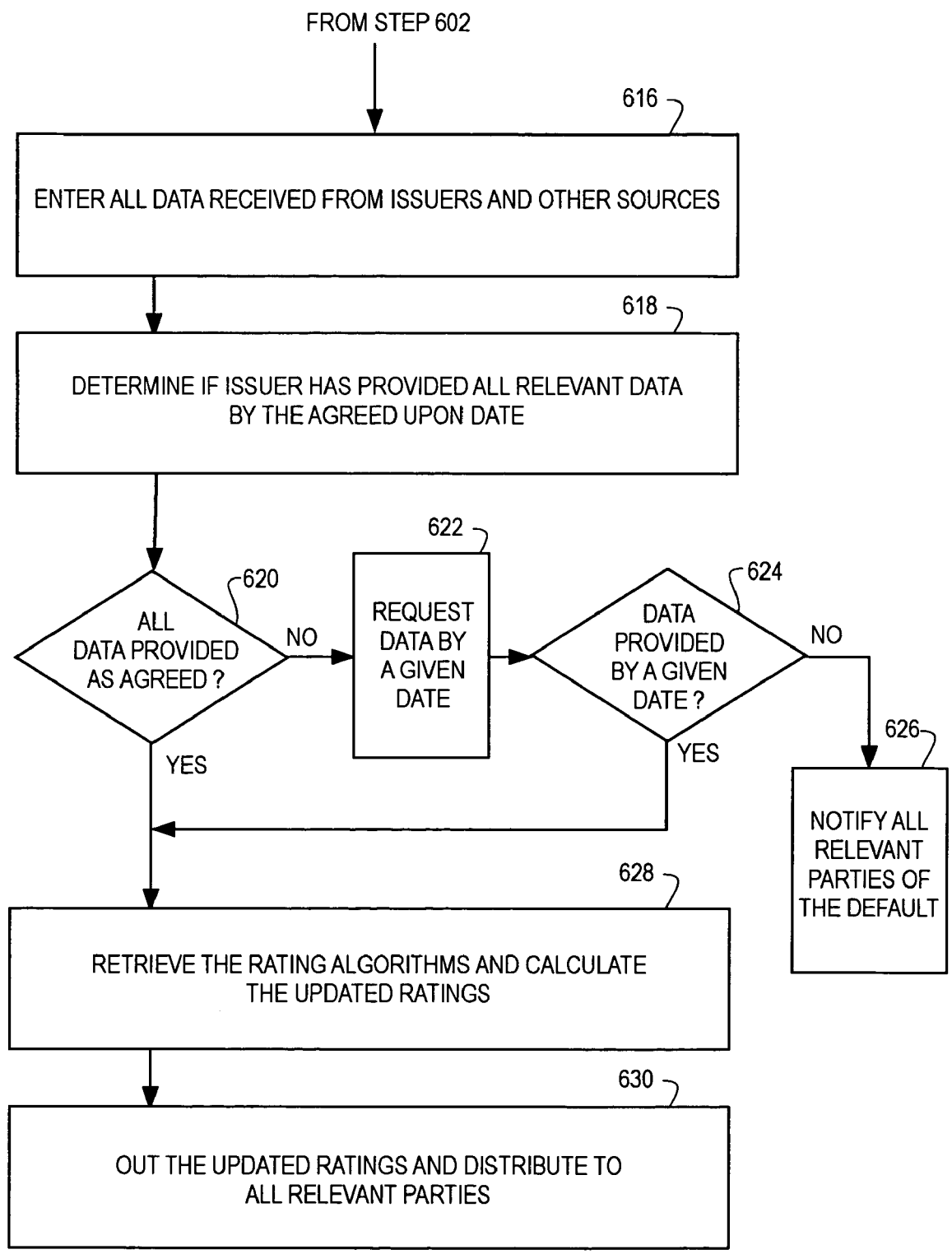
Figure 3B:
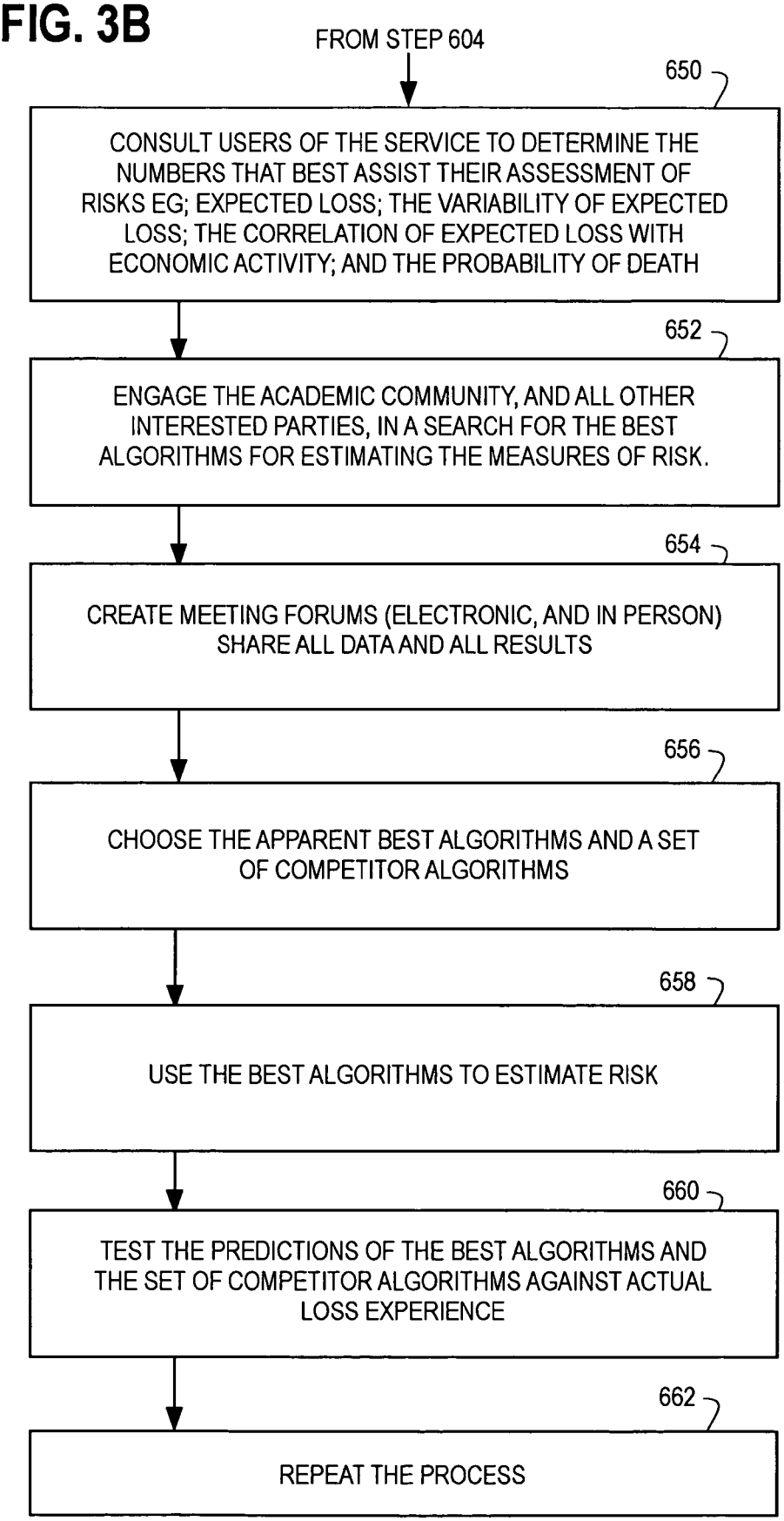

FIG. 1 is an illustration of an embodiment.
FIG. 1A is an illustration of an embodiment;
FIG. 2 is an illustration of a flow chart for an embodiment.
FIG. 2A is an illustration of a flow chart for an embodiment.
FIG. 2B is an illustration of a flow chart for an embodiment.
FIG. 2C is an illustration of a flow chart for an embodiment.
FIG. 2D is an illustration of a flow chart for an embodiment.
FIG. 2E is an illustration of a flow chart for an embodiment.
FIG. 3 is an illustration of a flow chart for an embodiment.
FIG. 3A is an illustration of a flow chart for an embodiment.
FIG. 3B is an illustration of a flow chart for an embodiment.

IV. MODES

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow can be implemented in discrete circuits. Computer-readable media, as used herein can comprise at least one of a RAM, a ROM, A disk, an ASIC, and a PROM. Industrial applicability is clear from the description, and is also stated below.

By way of the following prophetic teaching, there is provided computer support, as in a data processing system, for implementing parts of, or from, a financial product or instrument to accomplish certain financial objectives. As may be implemented in a multiple computer system supporting a private constant-dollar financial product, the system includes two or more computers. For example, as may be desired in one implementation or another, the computers can include at least one from a group including, but not limited to: an investment-creating computer; a servicing computer; an investment banker computer; a mortgage banker computer; a trading computer; a broker computer; a rating agency computer; a reporting computer; an investment manager computer; an investment company computer; an investment advisor computer; a bank computer; an insurance computer; a pension fund computer; a clearing computer; an investor computer; an accounting computer; and an issuer computer.

An accounting computer may be any computer that is providing accounting services for any entity that is supporting the private constant-dollar financial product, including a computer of a public accounting firm as well as a computer of the entity itself. A broker computer may be the computer of a mortgage broker, a securities broker, a broker/dealer, and/or a broker's broker. A bank computer may be the computer of any variety of depository institution, including a commercial bank, a savings and loan, a savings bank, a credit union, etc.

The system may, of course be differently comprised, but approaches may call to include one or more other computers. Possible examples include, but are not limited to: a finance company computer, a leasing company computer, a business computer, a nonfinancial corporation computer, a financial institution computer, a consumer computer, a household computer, a student computer, an educational institution computer, a religious institution computer, a charitable institution computer, an academic computer, a researcher computer, a foreign investment-creating computer, a foreign servicing computer, a foreign investment banker computer, a foreign mortgage banker computer, a foreign trading computer, a foreign broker computer, a foreign rating agency computer, a foreign reporting computer, a foreign investment manager computer, a foreign investment advisor computer, a foreign bank computer, a foreign insurance computer, a foreign pension fund computer, a foreign clearing computer, a foreign investor computer, a foreign accounting computer, a foreign issuer computer, a foreign financing company computer, a foreign leasing company computer, a foreign business computer, a foreign nonfinancial corporation computer, a foreign financial institution computer, a foreign business computer, a foreign consumer computer, a foreign household computer, a foreign student computer, a foreign educational institution computer, a foreign religious institution computer, a foreign charitable institution computer, a foreign academic computer, and/or a foreign researcher computer.

Any such computer may be in any form or combination, including, but not limited to: a mainframe computer and terminal(s) configuration, a client/server computer configuration, a configuration comprised of a personal computer, a desk-top computer, a lap-top computer, a pocket computer, a palm computer, a personal digital assistant, a digital cell phone or other portable device, but other ways of thinking, embodiments can extend to comprising a Wi-Fi node, an embedded processor, a car or other vehicle computer, a lightwave computer, a biological or hybrid computer, a quantum computer, etc.

The computers that may be part of the computer system may connect into the system on a continuing basis, intermittently, or on a one-time basis. There may be more than one multiple computer system comprised as set out above, and said systems may interconnect on a continuing basis, intermittently, one-time or not at all.

The system may include more than one of any variety of computer. For example, there may be more than one investor advisor computer, more than one issuer computer, more than one broker computer, etc.

A computer may perform more than one function in the system. For example, a bank computer may perform any one or more of the following functions including, but not limited to: transactions services (including possibly constant-dollar transaction services); creating constant-dollar investments; issuing constant-dollar financial products such as constant-dollar deposits, constant-dollar forward contracts, constant-dollar options, constant-dollar swaps, etc.; investing in constant-dollar financial products such as constant-dollar loans, constant-dollar leases, constant-dollar securities, etc.; mortgage banking; investment banking; brokerage; and/or accounting.

By way of illustration and not limitation, the multiple computer system may include: 1) a first computer controlled by a program to carry out steps including storing private, constant-dollar financial product data; storing nominal dollar data corresponding to said private, constant-dollar financial product data; 2) a second computer controlled by a program to carry out steps including storing said private, constant-dollar financial product data; storing said nominal dollar data corresponding to said private, constant-dollar financial product data; and, 3) a communications system between the computers; wherein said computers cooperate in a process including use of said data in computing a constant dollar to nominal dollar conversion for the financial product; and; wherein said computers are respectively programmed to generate different output using said stored data.

The computers may be connected, or not connected, in any pattern and may cooperate in groups of two or more. The connections need not be continuously maintained; they may be intermittent, one-time or ongoing. One or more of these connections may involve the use of the Internet, an intranet, e-mail, instant messaging, text messaging, voice mail, a local area network (LAN), a wide area network (WAN), a twisted pair of copper wires, a coaxial cable, a cellular network, Wi-Fi, wide area Wi-Fi, a Wi-Fi network, a light-wave transmission, infrared, and/or a wireless connection. One of more of the connections may involve one-way communication only. One or more may involve two-way communication. Real time communications are another possibility.

Private constant-dollar financial products are financial products that are comprised of, utilize and/or are derived from one or more private constant-dollar financial instruments. Private constant-dollar financial instruments can be financing instruments issued by (i.e., they are liabilities of or interests in) funds users who are subject to default risk, including (but not limited to): individuals, households, for-profit businesses, corporations, partnerships, limited partnerships, sole proprietorships, financial intermediaries, depository institutions, banks, credit unions, thrifts, savings and loans, savings banks, insurance companies, investment companies, real estate investment trusts (REITS), limited-liability companies, not-for-profit businesses, nongovernmental organizations, trusts, real estate mortgage investment conduits (REMICS), other pass-through entities, municipal governments (state and local governments), agencies of municipal governments, school districts, water districts, transportation districts, other special purpose districts, and federally sponsored enterprises (e.g., Federal National Mortgage Association, Federal Home Loan Mortgage Corporation, etc.). The issuers of private constant-dollar financial instruments may be domiciled in the U.S. or in other countries.

Unlike the federal government, the issuers of private constant-dollar financial instruments do not have the power to print money. Therefore, unlike securities issued by the national or federal government, private constant-dollar financial instruments are subject to default risk and this default risk may be reduced by matching the payments promised by the instruments to the expected future revenues of the issuer. The fixed real (purchasing power) payments of the private constant-dollar financial instruments can be tailored to produce a reasonable, or even the best possible, match between promised real payment amounts and the expected future real revenues of the issuer, thus reducing the default risk relative to alternative instruments which do not have fixed real payments and cannot, therefore, be tailored to produce a reasonable, or even the best possible, match between promised payments and expected future real revenues.

Note that the use of the U.S. government is illustrative, as the concept applies equally well to other governments that have the power to print money.

Constant-dollar financial instruments are financial instruments whose terms (e.g., payment amounts, rate of return or interest rate, schedule of remaining principal balances, etc.) can be specified in units of constant purchasing power, such as dollars that have been adjusted using an index such as a price index (for example, one of the variations of the Consumer Price Index) so as to maintain constant purchasing power. However, the term "constant-dollar financial instrument" can apply to financial instruments whose terms are specified in units that are held constant in purchasing power and/or are adjusted through the application of some suitable index.

The units that are held constant in purchasing power and/or are adjusted by an index may be any currency (not just dollars) and they may be held constant and/or adjusted by any desired price index or other economic index. Said currency may be any national currency (e.g., U.S. dollars, Canadian dollars, Australian dollars, Mexican pesos, British pounds, Swiss francs, euros, yen, rubles, zlotys, Danish kroner, etc.) or any other variety of currency including private and/or local currencies. Possible varieties of said price or other index may include, but are not limited to: 1) a price index for the respective national economy as a whole (e.g., in the U.S., the consumer price index for all urban consumers, the gross domestic product deflator, etc.); 2) a price index for some component of the respective national economy (e.g., a health care price index, a housing price index, a commodity price index, an index made up of a single price such as the price of gold or the price of oil, an export price index, an import price index, a traded goods index, a wholesale price index, a goods price index an electronic goods price index, a services price index, the consumer price index for a specified urban area, the consumer price index for a specified region, etc.); 3) an economic index for the respective national economy as a whole (e.g., in the U.S., the nominal gross domestic product, the real gross domestic product, productivity, nominal wages, real wages, total nominal labor compensation, total real labor compensation, etc.); and, 4) a local or regional economic index (e.g., regional nominal gross domestic product, regional real gross domestic product, regional productivity, regional nominal wages, regional real wages, etc.)

This context for the term "constant-dollar financial instrument" is applicable herein, and private constant-dollar financial products can be comprised of, utilize and/or are derived from one or more private constant-dollar financial instruments, where the term "constant-dollar financial instrument" applies to instruments whose units that are held constant may be any currency adjusted by any desired price index or other economic index.

Private constant-dollar financial instruments may or may not be "private" in the sense that the data regarding the instrument or the issuer is private. Indeed, in the case of a public issue of private constant-dollar financial instruments, federal and state securities laws mandate extensive public disclosure of data regarding both the securities and the issuer of the securities.

Constant-dollar financial instruments may be converted into equivalent nominal dollar financial instruments because payments presently are made in nominal dollars and because accounting, both for purposes of reporting and for calculating taxes, is presently carried out in terms of nominal dollars. Two processes have been invented for performing said conversion, both by an inventor of the present invention. The first is disclosed in U.S. Pat. No. 5,237,500 and the second is disclosed in U.S. patent application Ser. No. 09/283,102, U.S. Pat. No. 6,760,710, both incorporated by reference herein.

Private constant-dollar financial products that hold purchasing power constant (by adjusting the nominal currency amounts by an agreed upon price index) are distinguished from other private financial products (i.e., financial products that are comprised of, utilize, and/or are derived from private financial instruments that are not constant-dollar instruments) by their virtual elimination of inflation risk and their ability to reduce default risk. They may also reduce interest rate risk because real interest rates are less volatile than nominal interest rates.

Examples of private constant-dollar financial instruments include, but are not limited to:

1. Constant-dollar mortgages.
2. Constant-dollar construction loans.
3. Constant-dollar residential mortgages, where the mortgage or deed of trust securing the note is a mortgage or deed of trust on a 1 to 4 family residential property.
4. A constant-dollar reverse loan, including a constant-dollar reverse mortgage which enables a consumer to tap the equity in their residence by receiving payments of constant purchasing power amounts, with the resulting constant-dollar loan being repaid through the sale of the residence at some defined point
5. Constant-dollar commercial mortgages, where the mortgage or deed of trust securing the note is a mortgage or deed of trust on commercial property including office, retail, industrial, multi-family residential, and mobile-home properties.
6. Constant-dollar second mortgage or home-equity loans.
7. Constant-dollar second mortgage or deed-of-trust financing for commercial properties.
8. Constant-dollar personal loans.
9. Constant-dollar auto loans.
10. Constant-dollar vehicle loans.
11. Constant-dollar loans to finance consumer durables.
12. Constant-dollar leases.
13. Constant-dollar leases to finance automobiles.
14. Constant-dollar leases to finance consumer durables.
15. Constant-dollar leases to finance boats or ships.
16. Constant-dollar leases to finance business property.
17. Constant-dollar leases to finance aircraft, aircraft engines, airframes, combinations thereof, railroad rolling stock, trucks, buses, trams, trollies or lorries.
18. Constant-dollar leases to finance real property.
19. Constant-dollar leveraged-leases where the lessor finances a large portion of the purchase price of the asset with a nonrecourse constant-dollar loan that is secured by a first claim on the leased asset.
20. Constant-dollar business loans.
21. Constant-dollar term loans.
22. Constant-dollar notes.
23. Constant-dollar international lending contracts.
24. Constant-dollar bonds including bullets, serials, zero-coupon and combinations thereof.
25. Constant-dollar fully-amortizing bonds.
26. Constant-dollar partially-amortizing bonds.
27. Constant-dollar bonds or loans or loans with any desired amortization structure.
28. Constant-dollar bonds with sinking funds.
29. Constant-dollar private placement bonds.
30. Constant-dollar public issue bonds.
31. Constant-dollar medium-term notes, which are constant-dollar bonds (that can be of any maturity, in spite of the name) that are issued on a continuing basis over time rather than through the batch process of traditional underwriting.
32. Constant-dollar debentures.
33. Constant-dollar subordinated debentures.
34. Constant-dollar capital notes.
35. Constant-dollar mortgage bonds.
36. Constant-dollar equipment trust certificates.
37. Constant-dollar asset-backed securities.
38. Constant-dollar mortgage-backed securities.
39. Constant-dollar preferred stock.
40. Constant-dollar fully-amortizing preferred stock.
41. Constant-dollar limited partnership units.
42. Constant-dollar preferred-return LLC (Limited Liability Company) units.
43. Constant-dollar income bonds, where the issuing organization makes the promised real (purchasing power) payment only if it has income sufficient to make the payment. Payments that are not paid may cumulate with or without compounding (payment of interest on interest).
44. Constant-dollar deposits.
45. Constant-dollar certificates of deposit.
46. Constant-dollar Eurodollar deposits.
47. Constant-dollar currency, which is created when constant-dollar deposits are made checkable and/or transferable through electronic funds transfer means.
48. Constant-dollar insurance.
49. Constant-dollar whole life policies.
50. Constant-dollar universal life policies.
51. Constant-dollar variable life policies.
52. Constant-dollar annuities.
53. Constant-dollar fixed annuities.
54. Constant-dollar guaranteed investment contracts.
55. Constant-dollar municipal bonds.
56. Constant-dollar tax-exempt bonds.
57. Constant-dollar general obligation bonds.
58. Constant-dollar revenue bonds.
59. Constant-dollar double barrel bonds.
60. Constant-dollar instruments with variable real returns.
61. Constant-dollar instruments with caps and/or floors on the equivalent nominal returns.
62. Constant-dollar instruments with caps or restrictions on the nominal payment amounts.
63. Constant-dollar instruments with caps or restrictions on the nominal balance amounts.
64. Constant-dollar instruments convertible into other constant-dollar instruments.
65. Constant-dollar instruments that include options.
66. Constant-dollar instruments with the option to choose a different (constant purchasing power) currency—e.g., constant euros, constant yen, constant pounds, constant pesos, etc.
67. Constant-dollar instruments with the option to choose a different index—e.g., a services cost index, a commodity cost index, a gold price index, an oil price index, an energy price index, etc.

68. Constant-dollar instruments convertible into common stock.
69. Common stock convertible into constant-dollar instruments.
70. Constant-dollar instruments with warrants attached.
71. Constant-dollar instruments convertible into nominal instruments.
72. Nominal instruments convertible into constant-dollar instruments.

The user of the funds (issuer of the constant-dollar instrument) may be domiciled in U.S. and/or another country. The underlying currency may U.S. dollars, Canadian dollars, Mexican pesos, British pounds, euros, yen, Australian dollars or any other currency. The instrument may offer the investor and/or the issuer the option to choose from a list of one or more currencies and/or one or more indices.

Possible private constant-dollar financial products include all private constant-dollar financial instruments and combinations or portfolios thereof plus financial products that utilize and/or are derived from private constant-dollar financial instruments and/or products. Possible private constant-dollar financial products that utilize and/or are derived from private constant-dollar financial instruments include, but are not limited to:

1. Constant-dollar mutual fund shares, which are undivided interests in the net assets of an open-end investment company that invests predominantly in private constant-dollar financial instruments.
2. Constant-dollar pass-through securities, which are undivided interests in a pool of financial assets that are predominantly private constant-dollar financial instruments.
3. Constant-dollar variable annuities, which are variable annuities for which the investment portfolio for a variable annuity is made up predominantly of private constant-dollar financial instruments.
4. Constant-dollar separate accounts, which are separate accounts of an insurance company that are invested predominantly in a portfolio of private constant-dollar financial instruments.
5. Constant-dollar investment company shares, which are shares in an investment company that invests predominantly in private constant-dollar financial instruments.
6. Constant-dollar closed-end investment company shares, which are shares in a closed-end investment company that invests predominantly in private constant-dollar financial instruments.
7. Constant-dollar trusts, which are interests in trusts that invest predominantly in private constant-dollar financial instruments.
8. Constant-dollar unit investment trusts, which are unit investment trusts that invest predominantly in private constant-dollar financial instruments.
9. Constant-dollar real estate mortgage investment conduits, which are real estate mortgage investment conduits that invest predominantly in private constant-dollar mortgages.
10. Constant-dollar real estate investment trusts, which are real estate investment trusts that invest predominantly in private constant-dollar financial instruments.
11. Constant-dollar swaps, which are swaps where one or more of the payment streams involved in the swap is a payment stream of a private constant-dollar financial instrument.
12. Constant-dollar pensions, which are pensions that pay fixed purchasing power amounts.
13. Constant-dollar pension plans, which are pension plans that invest predominantly in private constant-dollar securities.
14. Constant-dollar defined benefit plans, which are defined benefit pension plans that invest predominantly in private constant-dollar financial instruments.
15. Constant-dollar defined contribution plan, which are defined contribution pension or retirement plans that invest predominantly in private constant-dollar financial instruments.
16. Constant-dollar 401(k) or 403(b) plans, which are 401(k) or 403(b) plans that invest predominantly in private constant-dollar financial instruments.
17. Constant-dollar Independent Retirement Accounts (IRAs), which are IRAs that invest predominantly in private constant-dollar financial instruments.
18. Constant-dollar Keoghs, UGMA, UTMA, Coverdell, Health Savings Accounts, college savings plans, travel expense saving account or other accounts designed or created to cover certain expenses and may include tax incentives such as the ability to invest with before tax dollars, defer taxes, eliminate taxes, etc.
19. A constant-dollar futures contract, which is a futures contract involving one or more private constant-dollar financial instruments.
20. A constant-dollar currency futures contract, which is a futures contract involving two constant-dollar currencies (e.g., constant dollars and constant euros, constant euros and constant pounds, constant dollars and constant pesos, etc.).
21. A constant-dollar forward, which is a forward contract involving one or more private constant-dollar financial instruments.
22. A constant-dollar currency forward, which is a forward contract involving two constant-dollar currencies (e.g., constant dollars and constant euros, constant euros and constant pounds, constant dollars and constant pesos, etc.).
23. A constant-dollar options contract, which is an option contract involving a private constant-dollar financial instrument, a private constant-dollar future, a private constant-dollar forward, or a private constant-dollar swap.
24. A constant-dollar derivative, which is a financial derivatives contract involving a constant-dollar financial instrument or product.

FIG. 1 illustrates an embodiment of the present invention in a simple form. More than one computer systems 10 (such as IBM PCs, Hewlett Packard printers and monitors, discs 12 and 13 that may have respective programs and/or data, etc., as illustrated in greater detail hereinafter). Respectively, the computers are 10 controlled by the respective programs to carry out steps including: storing private, constant-dollar financial product data; and storing nominal dollar data corresponding to said private, constant-dollar financial product data. There is a communications system between the computers, or means for communicating, for example, by a connection such as a network, e.g., the Internet. The computers cooperate in a process including use of said data in computing a constant dollar to nominal dollar conversion for the financial product; and wherein said computers are respectively programmed to generate different output 14 and 16 using said stored data. Each of the computer systems 10 in FIG. 1 can be viewed as a transmission system, and/or a receiver, respectively sending and/or receiving constant dollar data, with the communications reflecting information regarding the particular constant dollar financial product of concern in the embodiment of choice.

FIG. 1A illustrates a representative embodiment, or possibilities there of, the multiple computer system supporting a private constant-dollar financial product may include at least one from the following, but is not limited to: an investment-creating computer (100); a servicing computer (102); an investment banker computer (104); a mortgage banker computer (106); a trading computer (108); a broker computer (110); a rating agency computer (112); a clearing computer (114); an accounting-computer (116); an issuer computer (118); a reporting computer (120); an investor computer (122); an investment manager computer (124); an investment advisor computer (126); an investment company computer (128); a bank computer (130); an insurance computer (132); a pension fund computer (134). As represented in FIG. 1A, each said computer can have a corresponding input means (136) such as a keyboard, a storage means (138) such as a disk drive, and an output means (140) such as a printer, modem, etc. 136, 138, and 140 can be viewed, in a sense, as plugging into any of the computers, as illustrated in FIG. 1A. An accounting computer may be any computer that is providing accounting services for any entity that is supporting the private constant-dollar financial product, including a computer of a public accounting firm as well as a computer of the entity itself. A broker computer may be the computer of a mortgage broker, a securities broker, a broker/dealer, and/or a broker's broker. FIG. 1A contemplates the possibility of other computer(s) 135 beyond those listed.

The computers such as on FIG. 1A, which illustrate in greater detail computer systems 10 in FIG. 1, may include one or more input means (136). Possible examples of said input means (136) include, but are not limited to: a keyboard, a scanner, a voice recognition device, a connection with another computer and/or other digital device, etc. Any computer in the FIG. 1A may, or may not, employ any input means (136), either individually or in cooperation with another computer. Data may be input into one or more of the computers of FIG. 1A using one or more input means (136). The input into one or more of the computers of the FIG. 1A may include one or more software programs, including, but not limited to: a software program stored on a disk, a software program stored on a memory card or stick, a software program stored on tape, a software program stored in a holographic storage device, a software program stored on a computer memory device, and/or a software program stored on another computer or other digital device.

Any such computer as in FIG. 1A may include one or more storage means (138). Possible examples of said storage means (138) include, but are not limited to: a magnetic disk drive, an optical disk drive, a holographic disk drive, a tape drive, a memory card or stick, dynamic random access memory (dynamic RAM), static random access memory (static RAM), and/or another computer or other such device. Any computer in the FIG. 1A may or may not employ more than one of any such storage means (138).

Any such computer as in FIG. 1A may (by itself or in cooperation with one or more other computers) input, generate, store, modify and/or output a database regarding a constant-dollar financial product. Said database may have value and the entity that controls the database may charge for access to said database (for example, on a subscription basis and/or a per use basis). Thus said database may itself be considered to be a private constant-dollar financial product because it is a financial product derived from one or more private constant-dollar financial products. Possible examples of said database include, but are not limited to: a database of terms, prices, yields, ratings, and/or transactions regarding one or more private constant-dollar financial products stored on a reporting computer operated by a reporting company such as Bloomberg or Reuters; a database of trades and/or transaction orders regarding one or more private constant-dollar financial products stored on a trading computer; a database of credit ratings for private constant-dollar financial products stored on a rating agency computer; a database of approved (under Islamic law) private constant-dollar financial products stored on an Islamic computer; and a database of studies of investment performance of private constant-dollar financial products stored on a researcher computer.

Any such computer as in FIG. 1A may include one or more output means (140). Possible examples of said output means (140) include, but are not limited to: a monitor, a printer, a voice synthesizer, a disk drive, a holographic disk drive, and a connection with another computer and/or other device. Any such computer as in FIG. 1A may, or may not, employ any output means (140), either individually or in cooperation with another computer. Data may be output from one or more of the computers such as in FIG. 1A using one or more output means (140). The output from one or more of the computers such as in FIG. 1A may include one or more software programs, including, but not limited to: a software program stored on a disk, a software program stored on a memory card or stick, a software program stored on tape, a software program stored on a holographic disc drive, and/or a software program transmitted to another computer or other device.

If the private constant-dollar financial product is a private constant-dollar financial instrument (e.g., a constant-dollar loan, mortgage, bond, asset-backed security, etc.), then the investment-creating computer (100) may create the constant-dollar financial instrument. The investment-creating computer (100) may also convert the private constant-dollar financial instrument into an equivalent nominal dollar instrument using either the original process disclosed in U.S. Pat. No. 5,237,500 or the improved process disclosed in U.S. patent application Ser. No. 09/283,102 or any other process.

It may be that the private constant-dollar financial product created by the investment-creating computer is not a private constant-dollar financial instrument although it does utilize and/or is derived from one or more private constant-dollar financial instruments. In this case, the investment-creating computer may still cooperate in the process of computing a constant dollar to nominal dollar conversion for the product whether or not it is converting a constant-dollar financial instrument into an equivalent nominal dollar instrument using the original process disclosed in U.S. Pat. No. 5,237,500 or the improved process disclosed in U.S. patent application Ser. No. 09/283,102 or any other process.

There may be more than one investment-creating computer (100) such as in FIG. 1A, one or more of which is creating a private constant-dollar financial product that is a private constant-dollar financial instrument and one or more of which is creating a private constant-dollar financial product that is not a private constant-dollar financial instrument. There may also be more than one of the other varieties of computers such as in FIG. 1A.

By way of illustration, with regard to computers such as those in FIG. 1A, the following are incorporated by reference.

TRADING COMPUTER 108

U.S. Pat. No. 6,618,707 Gary; Katz (Assigned to International Securities Exchange)

AUTOMATED EXCHANGE FOR TRADING DERIVATIVE SECURITIES

H2,064 Buchalter (Assigned to Goldman Sachs & Company)

AUTOMATED FIXED INCOME TRADING

U.S. Pat. No. 6,195,647 Martyn, et al (Assigned to Nasdaq Stock Market, Inc.)

ON-LINE TRANSACTION PROCESSING SYSTEM FOR SECURITY TRADING

U.S. Pat. No. 6,691,094 Herschkorn; Lee N.

BANK LOAN TRADING SYSTEM AND METHOD

U.S. Pat. No. 6,233,566 Levine, et al

SYSTEM, METHOD AND COMPUTER PRODUCT FOR ONLINE FINANCIAL PRODUCT TRADING

U.S. Pat. No. 6,029,146 Hawkins, et al

METHOD AND APPARATUS FOR TRADING SECURITIES ELECTRONICALLY

U.S. Pat. No. 5,915,209 Lawrence, David

BOND TRADING SYSTEM

U.S. Pat. No. 6,615,188 Breen, et al

ONLINE TRADE AGGREGATION SYSTEM

U.S. Pat. No. 4,903,201 Wagner, Susan W.

AUTOMATED FUTURES TRADING SYSTEM

U.S. Pat. No. 4,412,287 Braddock III; Walter D.

AUTOMATED STOCK EXCHANGE

BROKER COMPUTER 110

U.S. Pat. No. 6,601,044 Wallman; Steven M. H. (Assigned to FolioFN, Inc.)

METHOD AND APPARATUS FOR ENABLING INDIVIDUALS OR SMALLER INVESTORS OR OTHERS TO CREATE AND MANAGE A PORTFOLIO OF SECURITIES OR OTHER ASSETS OR LIABILITIES ON A COST EFFECTIVE BASIS

U.S. Pat. No. 6,360,210 Wallman; Steven M. H. (Assigned to Folio Trade LLC)

METHOD AND SYSTEM FOR ENABLING SMALLER INVESTORS TO MANAGE RISK IN A SELF-MANAGED PORTFOLIO OF ASSETS/LIABILITIES

These may fit best under "Broker Computer 110" although they could also possibly go under "Investor Computer 122."

BANK COMPUTER 130

U.S. Pat. No. 6,535,855 Cahill, et al (Assigned to Chase Manhatten Bank)

PUSH BANKING SYSTEM AND METHOD

INVESTMENT BANKER COMPUTER 104

U.S. Pat. No. 6,629,082 Hambrecht, et al (Assigned to W. R. Hambrecht & Co.)

AUCTION SYSTEM AND METHOD FOR PRICING AND ALLOCATION DURING CAPITAL FORMATION

SERVICING COMPUTER 102

U.S. Pat. No. 6,643,625 Acosta, et al (Assigned to GE Mortgage Holdings LLC)

SYSTEM AND METHOD FOR AUDITING LOAN PORTFOLIOS AND LOAN SERVICING PORTFOLIOS

PENSION FUND COMPUTER 134

U.S. Pat. No. 6,154,732 Tarbox; Brian Christopher

SYSTEM FOR PROVIDING INVESTMENT ADVICE AND MANAGEMENT OF PENSION ASSETS

INSURANCE COMPUTER 132

U.S. Pat. No. 6,714,914 Peters, et al (Assigned to PeopleSoft, Inc.)

INTEGRATED SYSTEM FOR THE ADMINISTRATION OF AN INSURANCE COMPANY

U.S. Pat. No. 6,604,080 Kern; David G. (Assigned to B & S Underwriters, Inc.)

COMPUTER SYSTEM AND METHODS FOR SUPPORTING WORKERS' COMPENSATION/EMPLOYEE LIABILITY INSURANCE

U.S. Pat. No. 5,991,733 Aleia, et al (Assigned to Hartford Fire Insurance Company)

METHOD AND COMPUTERIZED SYSTEM FOR MANAGING INSURANCE RECEIVABLE ACCOUNTS

INVESTMENT COMPANY COMPUTER 128 application Ser. No. 09/467,646 Perg, et al

DIGITAL COMPUTER SYSTEM FOR OPERATING A CUSTOMIZABLE INVESTMENT FUND application Ser. No. 09/375,817 Perg, et al DIGITAL COMPUTER SYSTEM AND METHODS FOR A SYNTHETIC INVESTMENT AND RISK MANAGEMENT FUND application Ser. No. 09/280,244 Perg, et al

DIGITAL COMPUTER SYSTEM AND METHODS FOR MANAGING A SYNTHETIC INDEX FUND

U.S. Pat. No. 6,338,047 Wallman; Steven M. H. (Assigned to FOLIOfn Inc.)

METHOD AND SYSTEM FOR INVESTING IN A GROUP OF INVESTMENTS THAT ARE SELECTED BASED ON THE AGGREGATED, INDIVIDUAL PREFERENCES OF PLURAL INVESTORS

INVESTMENT MANAGER COMPUTER 124

U.S. Pat. No. 6,687,681 Schultz, et al (Assigned to Marshall & Ilsley Corporation)

METHOD AND APPARATUS FOR TAX EFFICIENT INVESTMENT MANAGEMENT

U.S. Pat. No. 6,393,409 Young, et al (Assigned to Morgan Stanley Dean Witter and Company)

COMPUTER METHOD AND APPARATUS FOR OPTIMIZING PORTFOLIOS OF MULTIPLE PARTICIPANTS

U.S. Pat. No. 6,336,102 Luskin, et al (Assigned to Wells Fargo Institutional Trust Company)

INVESTMENT FUND MANAGEMENT SYSTEM AND METHOD

U.S. Pat. No. 5,812,987 Luskin, et al (Assigned to Barclays Global Investors)

INVESTMENT FUND MANAGEMENT SYSTEM WITH DYNAMIC RISK ADJUSTED ALLOCATION OF ASSETS

U.S. Pat. No. 5,101,353 Lupien, et al

AUTOMATED SYSTEM FOR PROVIDING LIQUIDITY TO SECURITIES MARKETS

INVESTMENT ADVISOR COMPUTER SYSTEM 126

U.S. Pat. No. 5,819,263 Bromley (Assigned to American Express Financial Corporation)

FINANCIAL PLANNING SYSTEM INCORPORATING RELATIONSHIP AND GROUP MANAGEMENT

U.S. Pat. No. 6,253,192 Corlett, et al

METHOD OF PERSONAL FINANCIAL PLANNING

U.S. Pat. No. 6,219,650 Friend, et al (Assigned to EFI Actuaries)

METHOD OF DELIVERING OPTIMAL ASSET ALLOCATION UTILIZING CASH FLOW SIMULATION

U.S. Pat. No. 6,021,397 Jones, et al (Assigned to Financial Engines Inc.)

FINANCIAL ADVISORY SYSTEM

U.S. Pat. No. 6,018,722 Ray, et al

S.E.C. REGISTERED INDIVIDUAL ACCOUNT COMPUTER SYSTEM

It is to be understood that these are illustrative of computer systems such as those of FIG. 1.

In an illustrative example, constant-dollar mortgage-backed securities are one of the private constant-dollar financial products supported, for example, as illustrated representatively in FIG. 1A. The constant-dollar mortgage-backed securities are private constant-dollar financial instruments and are created by an investment-creating computer (100).

The income and assets behind the constant-dollar mortgage-backed securities may be provided by a pool of constant-dollar mortgages. The constant-dollar mortgages are also private constant-dollar financial instruments and they may have been created by one or more investment-creating computers (100) and said investment-creating computer may be a different than the investment-creating computer (100) for the constant-dollar mortgage-backed securities.

For example, the constant-dollar mortgages may be loans on U.S. one to four family residential real estate with monthly payments that are denominated in constant U.S. dollars and are adjusted for inflation annually using a U.S. price index such as the Consumer Price Index for all Urban Consumers (CPI-U). Or they may use a different price index to adjust for inflation and hold purchasing power constant or they may adjust for inflation more (e.g., monthly) or less frequently (e.g., every two years). Or the constant-dollar mortgages may be commercial mortgages on income properties in the U.S. such as office buildings, retail, industrial or multi-family properties.

The constant-dollar mortgages may be loans to foreign borrowers on real estate located outside of the U.S. For example, they may be residential mortgage loans to Mexicans on houses located in Mexico, denominated in constant purchasing power pesos (constant-peso loans) and adjusted for inflation every 6 months using a Mexican consumer price index. Or they may be commercial mortgage loans to Mexican businesses or other foreign businesses on properties located in Mexico or in other countries.

The legal entity that holds the pool of mortgages and issues the constant-dollar mortgage-backed securities may be a real estate mortgage investment conduit (REMIC) or any other appropriate legal organization, thus connecting an issuer computer system (118) into the system, or part thereof, of FIG. 1A or the like. It may be that the issuer computer (118) is the computer of the mortgage banker (106), investment banker (104) or other organization that owns the pool of constant-dollar mortgages before they are transferred to the REMIC or other entity that is utilized to securitize the mortgages.

The constant-dollar mortgage-backed securities may be in the same currency as the underlying constant-dollar mortgages and adjusted for inflation using the same price index with the same adjustment frequency. Or the adjustment frequency, the price index, and/or the currency of the constant-dollar mortgage-backed securities may differ from the adjustment frequency, price index and/or the currency of some or all of the underlying constant-dollar mortgages.

If the currency of the underlying constant-dollar mortgages differs from the currency of the constant-dollar mortgage-backed securities (e.g., constant-Mexican peso mortgages and constant-U.S. dollar mortgage-backed securities), the business that owns the pool of mortgages being financed may or may not choose to hedge some or all of the constant-dollar currency risk using constant-dollar currency swaps, constant-dollar currency forwards and/or constant-dollar currency futures.

Constant-dollar financial products can be used to eliminate almost all of the long-term currency risk in international financings. The long-term equilibrium exchange rate between any two currencies may be determined by purchasing-power-parity of traded goods. Because future inflation rates are unknown, it may not be possible to accurately estimate the future equilibrium nominal exchange rate. However, by eliminating the risk of future inflation, constant-dollar financial products may make it possible to accurately estimate the future equilibrium constant-dollar exchange rate.

In an illustrative example, suppose that the pool of constant-dollar mortgages are constant-Mexican peso mortgages on homes in Mexico owned by Mexicans and that the pool of mortgages is owned by a Mexican subsidiary of a U.S. commercial bank. The pool is to be financed by constant-dollar mortgage-backed securities that are to be sold in the U.S. The real interest rate in the U.S. on constant-U.S. dollar mortgage-backed securities sold in the U.S. may be significantly lower than the real interest rate on constant-Mexican peso mortgage-backed securities sold in the U.S. (adjusted for the same maturity and credit risk). The Mexican subsidiary of the U.S. commercial bank may engage the services of researchers (thus connecting a researcher computer into the system or part thereof, of FIG. 1A or the like) in order to estimate the constant-dollar currency risk of financing the constant-Mexican peso mortgages with constant-U.S. dollar mortgage-backed securities, the expected profit from accepting this risk, and/or the cost of laying off some or all of the constant-dollar currency risk using constant-dollar currency swaps, constant-dollar currency swaptions, constant-dollar currency forwards, constant-dollar currency futures, constant-dollar currency options and/or other constant-dollar currency derivatives.

If the Mexican subsidiary of the U.S. commercial bank decides to lay off some part of the risk using a constant-dollar currency swap, it may arrange with a swaps dealer (thus connecting a swaps dealer computer into the system, or part thereof, of FIG. 1A or the like) to swap constant-U.S. dollar payments for constant-Mexican peso payments. If it decides to lay off some of the risk using constant-dollar currency forwards, it may arrange with a market-maker in forwards (thus connecting a market-maker in forwards computer into the system, or part thereof, of FIG. 1A or the like) to buy constant-U.S. dollars forward for constant-Mexican pesos. If it decides to lay off some of the risk using constant-dollar currency futures, it may arrange with a commission merchant or futures broker to sell constant-Mexican peso futures contracts, thus connecting a commission merchant or futures broker computer and/or a futures exchange trading computer into the system, or part thereof, of FIG. 1A or the like.

As another possibility, the mortgages (regardless of the country where the properties are located and the currency of the mortgages) may be Islamic mortgages. Under Islamic law, the payment of interest and compounding (for payment of returns on returns) may be forbidden. It may be possible to create constant-dollar mortgage financing for a house that is consistent with Islamic law. In a possible example of constant-dollar mortgage financing that may be consistent with Islamic law, the "buyer" of a house might be the general partner of a limited partnership (or the owner of the equity interest of a limited liability company, or LLC) that is the actual purchaser of the house. The "lender" would be a constant-dollar limited partner in the partnership (or hold a constant-dollar preferred equity interest in the LLC). The "buyer" of the house might lease the house from the partnership or LLC under a long-term, triple-net (making the "buyer" responsible for all payment of all taxes, insurance and other operating expenses) constant-dollar lease with fixed real (purchasing power) payments. The constant-dollar limited partner (or holder of the constant-dollar preferred equity interest in the LLC) would receive the fixed real (purchasing power) payments, which would be set at an amount such that, if paid on time as per the lease agreement, would pay a fixed real (purchasing power) return to the constant-dollar limited partner (or constant-dollar preferred equity interest holder in the LLC) and fully amortize their real (purchasing power) investment over some agreed upon period.

The "mortgage loan" may not pay interest because the "lender" is actually an equity partner receiving a preferred return from the income of the property rather a lender receiving interest on a loan. Although the constant-dollar preferred equity interest is fully amortizing with fixed real payments at a real rate of return, compounding (payment of a return on a return) may be avoided by making the real (purchasing power) payments cumulative but not compounding in the event that payments are not made as agreed. The "lender" and "buyer" may utilize the computer-aided process for administering and enforcing the agreements (e.g., the agreements regarding the constant-dollar triple net lease, the agreements regarding the payment of the preferred constant-dollar return, etc.) governing private constant-dollar financial instruments that is a part of a preferred embodiment of the present invention. A process (illustrative, not limiting) is provided in FIGS. 2, 2A, 2B, 2C, 2D and 2E.

Upon payment of the last real (purchasing power) payment to the holder of the constant-dollar limited partnership interest (or the holder of the constant-dollar preferred equity interest in the LLC), the interest of the "lender" in the limited partnership (or LLC) is dissolved, the constant-dollar lease agreement becomes null and void, and the "buyer" becomes the sole owner of the partnership (or LLC) and its assets (the house). At that point the "buyer" may or may not choose to transfer the assets of the partnership (or LLC) to themselves, thus dissolving the partnership (or LLC) and assuming direct ownership of the house.

Similar arrangements might be utilized to provide Islamic law compatible constant-dollar financing for any consumer durable, including automobiles, boats, appliances, etc.) The use of multiple levels of priority of claims for the investors in the constant-dollar limited partnership interests (or constant-dollar preferred equity interests in the LLC) could result in the ability to offer the equivalent of second (or third) mortgage financing, making it possible to offer low or even zero down payment financing. Or the "buyer" might acquire an increasing subordinated (second or third priority) constant-dollar interest in the partnership over time as constant-dollar lease payments are made, thus protecting the interests of a "buyer" who has made the constant-dollar lease payments on time for years before hitting hard times and defaulting on the lease.

For the "lender" such an Islamic constant-dollar financing agreement might be less risky than a conventional constant-dollar mortgage loan because of the Islamic constant-dollar financing would avoid the risk of costly, lose-lose bankruptcy proceedings. Of course, lenders may be able to eliminate the risk of costly, lose-lose bankruptcy proceedings for conventional constant-dollar mortgage loans as well by choosing to use the computer-aided process for administering and enforcing the agreements governing private constant-dollar financial instruments that is a part of a preferred embodiment of the present invention. A process (illustrative, not limiting) is provided in FIGS. 2, 2A, 2B, 2C, 2D and 2E.

Islamic businesses might utilize similar arrangements to access Islamic law compatible constant-dollar financing for any business asset (e.g., plant and equipment) and/or the business itself. The use of multiple levels of priority of claims for the investors in the constant-dollar limited partnership interests (or constant-dollar preferred equity interests in the LLC) might provide the Islamic business with a complete range of risk/return Islamic law compatible financing options, thus possibly increasing the availability of financing and reducing its cost.

Returning to the constant-dollar mortgage-backed securities illustration of the system, or part thereof, of FIG. 1A or the like, some of the private constant-dollar mortgages may have been originated by mortgage brokers who connect into the system, or part thereof, of FIG. 1A or the like, a (mortgage) broker computer (110). Before quoting terms on a constant-dollar mortgage, the mortgage broker may have contacted one or more buyers or funders of constant-dollar mortgages, including possibly a mortgage banker, an investment banker, a depository institution, and/or a federally sponsored enterprise such as Fannie Mae or Freddie Mac—thus connecting a mortgage banker computer (106), an investment banker computer (104), a bank computer (130), and/or a federally sponsored enterprise computer into the system, or part thereof, of FIG. 1A or the like.

In response to a request for the quote, the mortgage banker computer (106) might send data including some or all of the following: a fixed real (purchasing power) rate of interest; an initial nominal interest rate; a price index; an adjustment (for inflation) frequency; a real payment amount; an initial nominal payment amount; a term and/or amortization in years; a loan amount; a loan to-value amount; a down payment amount; a "lock-in" time period for the quote; a pre-payment penalty; an origination fee amount; borrower credit quality requirements; etc.

After requesting a quote, the (mortgage) broker computer (110) might receive data including some or all of the following: a fixed real (purchasing power) rate of interest; an initial nominal interest rate; a price index; an adjustment (for inflation) frequency; a real payment amount; an initial nominal payment amount; a term and/or amortization in years; a loan amount; a loan-to-value amount; a down payment amount; a "lock-in" time period for the quote; a pre-payment penalty; an origination fee amount; borrower credit quality requirements; etc.

Upon agreement by the borrower on the terms of a constant-dollar mortgage quote obtained by the mortgage broker from a buyer or funder of constant-dollar mortgages, the mortgage broker may engage the services of a title company to provide title insurance and an appraiser to appraise the property using the (mortgage) broker computer (110) and connecting into the system, or part thereof, of FIG. 1A or the like, a title company computer and an appraiser computer. The mortgage broker may then originate and close the constant-dollar mortgage for the buyer or funder of the mortgage.

In an illustrative example, the buyer or funder of the constant-dollar mortgage is a mortgage banker. The mortgage banker computer (106) may receive data regarding the constant-dollar mortgage loan and the loan closing and connect with a bank computer (130) to arrange for a transfer of money in order to fund the constant-dollar mortgage at the loan closing. The mortgage banker may issue commercial paper, borrow from a depository institution or utilize some other form of short-term borrowing to buy or fund the constant-dollar mortgage, with said short-term borrowing to be repaid from the proceeds of securitizing the pool of constant-dollar mortgages.

The private constant-dollar mortgages in the pool that is to be securitized may be commercial constant-dollar mortgages or residential constant-dollar mortgages or both. In the example of commercial constant-dollar mortgages, the computer of the business that owns the commercial property may function as an issuer computer and connect into the system, or part thereof, of FIG. 1A or the like, an issuer (of mortgages) computer system (118).

The mortgage-banker may engage the services of an investment banker for the purpose of obtaining advice regarding the securitization of the pool of constant-dollar mortgages and connect an investment banker computer (104) into the system, or part thereof, of FIG. 1A or the like. In support of the request for advice, the mortgage banker computer (106) may send data regarding the pool that includes (but is not limited to) some or all of the following: the number of constant-dollar mortgage loans; the amounts of the constant-dollar mortgage loans; the total amount of constant-dollar mortgages; the real interest rates on the constant-dollar mortgages; the maturities of the constant-mortgage loans; the currencies of the constant-dollar mortgage loans; the price indices utilized by the constant-dollar mortgages; the frequency and/or dates for inflation adjustment of the constant-dollar mortgages; the loan-to-value ratios for the constant-dollar mortgages; income data for income properties being financed by constant-dollar mortgages in the pool; credit quality information regarding the borrowers; etc.

The investment banker computer (104) may receive data regarding the pool that includes (but is not limited to) some or all of the following: the number of constant-dollar mortgage loans; the amounts of the constant-dollar mortgage loans; the total amount of constant-dollar mortgages; the real interest rates on the constant-dollar mortgages; the maturities of the constant-mortgage loans; the currencies of the constant-dollar mortgage loans; the price indices utilized by the constant-dollar mortgages; the frequency and/or dates for inflation adjustment of the constant-dollar mortgages; the loan-to-value ratios for the constant-dollar mortgages; income data for income properties being financed by constant-dollar mortgages in the pool; credit quality information regarding the borrowers; etc.

The investment banker may utilize the investment banker computer (104) in a computer-aided process for researching possible structures for the securitization of the pool of constant-dollar mortgages. One possible structure would be to securitize the pool using constant-dollar pass-through securities. In this event, each investor would own an undivided interest in the pool and every constant-dollar pass-through security would have the same real return, the same maturity and the same credit risk.

However, different desires regarding maturities and different levels of risk tolerance among investors may make it possible to achieve a lower average real interest rate (relative to the real interest rate on the constant-dollar pass-through securities) by using constant-dollar mortgage-backed securities to finance the pool of constant-dollar mortgages. The constant-dollar mortgage-backed securities may be tranched by maturity and/or priority of claims on the income and assets of the pool in order to meet investor needs and lower the cost of financing the pool.

The investment banker may conduct research regarding the credit ratings and costs for various possible structures for financing the pool of constant-dollar mortgages. In the process of performing this research, the investment banker may contact and share data with a rating agency, a (securities) broker, a reporting company, an investor, an investment manager, an investment advisor, an investment company, a depository institution, an insurance company, and/or a pension fund. This research may connect into the system, or part thereof, of FIG. 1A or the like, a rating agency computer (112), a (securities) broker computer (110), a reporting company computer (120), an investor computer (122), an investment manager computer (124), an investment advisor computer (126), an investment company computer (128), a bank computer (130), an insurance computer (132), and/or a pension fund (134).

The investment banker computer (104) may send data regarding one or more structures for securitizing the pool of constant-dollar mortgages, including (but not limited to) some or all of the following: the estimated real returns on the constant-dollar securities; the credit ratings of the constant-dollar securities; the maturities of the constant-dollar securities; the amounts of the constant-dollar securities; the total amount of the constant-dollar securities; the cost of the financing; the gross proceeds of the financing; the net proceeds of the financing; etc.

The mortgage banker computer (106) may receive data regarding one or more structures for securitizing the pool of constant-dollar mortgages, including (but not limited to) some or all of the following: the estimated real returns on the constant-dollar securities; the credit ratings of the constant-dollar securities; the maturities of the constant-dollar securities; the amounts of the constant-dollar securities; the total amount of the constant-dollar securities; the cost of the financing; the gross proceeds of the financing; the net proceeds of the financing; etc.

The mortgage banker may engage the services of an investment banker for underwriting and distributing the constant-dollar mortgage-backed securities that will be used to finance the pool of constant-dollar mortgages. The private constant-dollar mortgage-backed securities may be rated by a rating agency and connecting into the system, or part thereof, of FIG. 1A or the like, a rating agency computer (118). The constant-dollar mortgage-backed securities may be serviced by a securities servicing company and may connect into the system, or part thereof, of FIG. 1A or the like, a (securities) servicing computer (102). Similarly, the constant-dollar mortgages in the pool may be serviced by a mortgage servicing company and may connect into the system, or part thereof, of FIG. 1A or the like, a (mortgage) servicing computer (102). Said mortgage servicing company may (or may not) be a division or subsidiary of the mortgage banker.

The (mortgage) servicing computer (102) may receive data regarding the constant-dollar mortgages that includes (but is not limited to) some or all of the following: the number of constant-dollar mortgage loans; the amounts of the constant-dollar mortgage loans; the total amount of constant-dollar mortgages; the real interest rates on the constant-dollar mortgages; the maturities of the constant-mortgage loans; the currencies of the constant-dollar mortgage loans; the price indices utilized by the constant-dollar mortgages; the frequency and/or dates for inflation adjustment of the constant-dollar mortgages; the loan-to-value ratios for the constant-dollar mortgages; income data for income properties being financed by constant-dollar mortgages in the pool; current payment information regarding the loans; current contact information for the borrowers; credit quality information regarding the borrowers; etc.

The (mortgage) servicing computer (102) may calculate and/or output data that includes (but is not limited to) some or all of the following: a current nominal dollar payment amount for a constant-dollar mortgage loan; a due date for a nominal dollar payment of a constant-dollar mortgage loan; a current nominal interest rate for a constant dollar mortgage loan; a nominal interest amount for a constant-dollar mortgage loan; a current nominal dollar balance for a constant-dollar mortgage loan; etc. The (mortgage) servicing computer (102) may determine whether or not a constant-dollar mortgage is in default and/or a payment is late. If the constant-dollar mortgage is in default and/or a payment is late it may output this information. It may connect with an issuer (borrower) computer (118) and send a notice regarding default and/or late payment. In the event of default and/or late payment, the (mortgage) servicing computer (102) may retrieve the terms of the constant-dollar mortgage loan, determine whether or not a penalty is to be applied and, if a penalty is to be applied, calculate and output said penalty.

The (securities) servicing computer (102)—which may be a different computer than the (mortgage) servicing computer (102)—may receive data regarding the constant-dollar mortgage-backed securities that includes (but is not limited to) some or all of the following: the real returns on the constant-dollar securities; the currencies of the constant-dollar securities; the price index for the constant-dollar securities; the times and/or frequencies of inflation adjustments; the priorities (senior, subordinated, junior subordinated, etc.) of the constant-dollar securities; the credit ratings of the constant-dollar securities; the maturities of the constant-dollar securities; the amounts of the constant-dollar securities; the total amount of the constant-dollar securities; the cost of the financing; the gross proceeds of the financing; the net proceeds of the financing; the current holders of the constant-dollar securities; contact information for the holders of the constant-dollar securities; the issuer of the constant-dollar securities; payment arrangements; payment agreements; etc.

The (securities) servicing computer (102) may calculate and/or output data that includes (but is not limited to) some or all of the following: a current nominal dollar payment amount for a constant-dollar mortgage-backed security; a due date for a nominal dollar payment of a constant-dollar mortgage-backed security; a current nominal interest rate for a constant dollar mortgage-backed security; a nominal interest amount for a constant-dollar mortgage-backed security; a current nominal dollar balance for a constant-dollar mortgage-backed security; etc. The (securities) servicing computer (102) may determine whether or not a constant-dollar mortgage-backed security is in default and/or a payment is late. If the constant-dollar mortgage-backed security is in default and/or a payment is late it may output this information. It may connect with the issuer (borrower) computer (118) and/or investor computer (122) and send a notice regarding default and/or late payment. In the event of default and/or late payment, the (securities) servicing computer (102) may retrieve the terms of the constant-dollar mortgage-backed security, determine whether or not an action is called for by the terms, and, if it is, output notice of said action.

The investment banker may create a syndicate to underwrite and distribute the constant-dollar mortgage-backed securities inducing possibly other investment bankers, broker dealers, and (securities) brokers. The computers of the syndicate, possibly including an investment banker computer (104), a broker/dealer computer (110), and/or a (securities) broker computer (110), may receive data regarding the constant-dollar mortgage-backed securities that includes (but is not limited to) some or all of the following: the real returns on the constant-dollar securities; the prices of the constant-dollar securities; the currencies of the constant-dollar securities; the price index for the constant-dollar securities; the times and/or frequencies of inflation adjustments; the priorities (senior, subordinated, junior subordinated, etc.) of the constant-dollar securities; the credit ratings of the constant-dollar securities; the maturities of the constant-dollar securities; the amounts of the constant-dollar securities; the total amount of the constant-dollar securities; the cost of the financing; the gross proceeds of the financing; the net proceeds of the financing; sales commissions, underwriting commissions; the issuer of the constant-dollar securities; payment arrangements; payment agreements; etc.

Securities brokers may market the constant-dollar mortgage-backed securities and connect a (securities) broker computer (110) into the system, or part thereof, of FIG. 1A or the like. Investors may research and/or purchase the constant-dollar mortgage-backed securities and connect an investor computer (122) into the system, or part thereof, of FIG. 1A or the like.

An investor may desire to buy or sell the constant-dollar mortgage-backed securities in the secondary (resale) market. The investor may engage a securities broker, entering a market order to buy or sell at the best available price or a limit order to buy or sell at a specified real return and/or price. The securities broker may then, utilizing the (securities) broker computer (110), contact the computer of a broker/dealer (110) that makes a market in the constant-dollar mortgage-backed securities for a quote and/or execution of the order. The broker/dealer may engage the services of a broker's broker in executing the trade and connect a broker's broker computer (110) in the system, or part thereof, of FIG. 1A or the like. Or the broker/dealer may connect the broker/dealer computer (110) to a trading computer (108) to enter and/or execute the order.

An investor may, utilizing an investor computer (122), connect to a trading computer (108) in order to obtain trading data on the constant-dollar mortgage-backed securities, obtain quotes from market makers, and/or enter a market or limit order to buy or sell. The connection may involve the Internet. It may be direct or it may go through the computer and/or web page of a securities dealer. The trading computer (108) may manage an automated auction market for constant-dollar securities, as disclosed in U.S. patent application Ser. No. 09/197,908 (Digital Computer System and Methods for Managing an Auction Market for Preferred-Return Securities) which is incorporated herein by reference. It may manage a combination auction and market/maker (or dealer or specialist) market. It may manage an over-the-counter, or dealer, market.

Trades of the constant-dollar mortgage-backed securities may be cleared by a clearing corporation, connecting a clearing computer (114) into the system, or part thereof, of FIG. 1A or the like. The clearing computer (114) may receive data on the constant-dollar mortgage-backed securities trade including (but not limited to) some or all of the following: the number of securities traded, the real return on the securities traded, the price of the securities traded, the securities broker representing the seller, the securities broker representing the buyer, the date and time of the trade, the buyer, the seller, etc.

Data regarding the constant-dollar mortgage-backed securities may be received by a reporting computer (120), including (but not limited to) some or all of the following: trading volume for the constant-dollar securities; current market real returns for the constant-dollar securities; current market prices for the constant-dollar securities; the real returns on the constant-dollar securities; the currencies of the constant-dollar securities; the price index for the constant-dollar securities; the times and/or frequencies of inflation adjustments; the priorities (senior, subordinated, junior subordinated, etc.) of the constant-dollar securities; the credit ratings of the constant-dollar securities; the maturities of the constant-dollar securities; the amounts of the constant-dollar securities; the total amount of the constant-dollar securities; the cost of the financing; the gross proceeds of the financing; the net proceeds of the financing; etc. The reporting computer (120) may reformat or otherwise transform or manipulate said data before outputting the reorganized data. The reporting computer (108) may send out said reorganized data. Said reorganized data may be received by a (securities) broker computer (110), an investor computer (122), an investment manager computer (124), an investment advisor computer (126), an investment company computer (128), a bank computer (130), an insurance computer (132), a pension fund computer (134), and/or other computers.

Investment managers may connect an investment manager computer (124) into the system, or part thereof, of FIG. 1A or the like. They may connect into the system, or part thereof, of FIG. 1A or the like in order to research, purchase, hold and/or sell constant-dollar financial products, including possibly the illustrative constant-dollar mortgage-backed securities. In the process of researching, purchasing, holding and/or selling constant-dollar financial products, they may connect the investment manager computer (124) to other computers in the system or part thereof, of FIG. 1A or the like, including, but not limited to, some or all of the following: a servicing computer (102), an investment banker computer (104), a mortgage banker computer (106), a trading computer (108), a broker computer (110), a rating agency computer (112), a clearing computer (114), an accounting computer (116), an issuer computer (118), a reporting computer (120), an investor computer (122), an investment advisor computer (126), an investment company computer (128), a bank computer (130), an insurance computer (132), a pension fund computer (134), etc.

Investment advisors may connect an investment advisor computer (126) into the system, or part thereof, of FIG. 1A or the like. They may research and/or make recommendations regarding constant-dollar financial products, including possibly the illustrative constant-dollar mortgage-backed securities. In the process of researching and/or making recommendations regarding constant-dollar financial products, they may connect the investment advisor computer (126) to other computers in the system, or part thereof, of FIG. 1A or the like, including, but not limited to, some or all of the following: a servicing computer (102), an investment banker computer (104), a mortgage banker computer (106), a trading computer (108), a broker computer (110), a rating agency computer (112), a clearing computer (114), an accounting computer (116), an issuer computer (118), a reporting computer (120), an investor computer (122), an investment manager computer (124), an investment company computer (128), a bank computer (130), an insurance computer (132), a pension fund computer (134), etc.

An investment company may connect an investment company computer (128) into the system, or part thereof, of FIG. 1A or the like. The investment company may connect into the system, or part thereof, of FIG. 1A or the like, in order to research, purchase, hold and/or sell constant-dollar financial products, including possibly the illustrative constant-dollar mortgage-backed securities. In the process of researching, purchasing, holding and/or selling constant-dollar financial products, they may connect the investment company computer (128) to other computers in the system, or part thereof, of FIG. 1A or the like, including, but not limited to, some or all of the following: a servicing computer (102), an investment banker computer (104), a mortgage banker computer (106), a trading computer (108), a broker computer (110), a rating agency computer (112), a clearing computer (114), an accounting computer (116), an issuer computer (118), a reporting computer (120), an investor computer (122), an investment manager computer (124), an investment advisor computer (126), an investment company computer (128), a bank computer (130), an insurance computer (132), a pension fund computer (134), etc.

If the investment company is a mutual fund (i.e., an open-end investment company) that invests predominantly in private constant-dollar financial products, the shares (which are undivided interests in the net assets of the fund) of the mutual fund themselves are private constant-dollar financial products. The same is true for a closed-end investment company or a unit investment trust that invests predominantly in constant-dollar financial products.

A hedge fund may connect a hedge fund computer into the system, or part thereof, of FIG. 1A or the like. The hedge fund may connect into the system, or part thereof, of FIG. 1A or the like, in order to research, purchase, hold and/or sell constant-dollar financial products, including possibly the illustrative constant-dollar mortgage-backed securities. In the process of researching, purchasing, holding and/or selling constant-dollar financial products, they may connect the hedge fund computer to other computers in the system, or part thereof, of FIG. 1A or the like, including, but not limited to, some or all of the following: a servicing computer (102), an investment banker computer (104), a mortgage banker computer (106), a trading computer (108), a broker computer (110), a rating agency computer (112), a clearing computer (114), an accounting computer (116), an issuer computer (118), a reporting computer (120), an investor computer (122), an investment manager computer (124), an investment advisor computer (126), an investment company computer (128), a bank computer (130), an insurance computer (132), a pension fund computer (134), etc.

If the hedge fund invests predominantly in private constant-dollar financial products, the hedge fund investment units (which may be limited partnership units or investments in a limited liability company) themselves are private constant-dollar financial products.

A depository institution (commercial bank, credit union, savings & loan, savings bank, and/or a holding company or service company for said depository institution, etc.) may connect a bank computer (130) into the system, or part thereof, of FIG. 1A or the like, in order to: issue constant-dollar deposits; issue constant-dollar Eurodollar deposits; issue other constant-dollar liabilities including possibly constant-dollar asset-backed securities, constant-dollar subordinated debentures, constant-dollar bankers acceptances, constant-dollar commercial paper, etc.; make constant-dollar loans; invest in constant-dollar financial products, including possibly the illustrative constant-dollar mortgage-backed securities; service constant-dollar financial products; make markets in constant-dollar financial products; clear trades in constant-dollar financial products; issue constant-dollar derivative products including possibly constant-dollar forwards, swaps, swaptions and/or options; and/or deal in constant-dollar derivative products including possibly constant-dollar forwards, swaps, swaptions and/or options.

The constant-dollar deposits that the depository institution may issue include, but are not limited to, some or all of the following constant-dollar savings accounts, constant-dollar certificates of deposit, constant-dollar Eurodollar deposits and constant-dollar checkable deposits. Constant-dollar checkable deposits are constant-dollar deposits that may be used to make payment by writing checks, electronic funds transfers, and/or the Internet. A depository institution may create a private constant-dollar currency by offering checkable constant-dollar deposits. The currency underlying the constant-dollar deposits may be U.S. dollars or any other currency. Any desired price index or other economic index may be used to adjust said currency.

The depository institution may make constant-dollar loans, leases and/or investments including, but not limited to, some or all of the following: constant dollar personal loans, constant-dollar vehicle loans, constant-dollar auto loans, constant-dollar consumer durable loans, constant-dollar second mortgage or home equity loans, constant-dollar leases, constant-dollar business loans, constant-dollar term loans, constant-dollar construction loans, constant-dollar mortgage loans, constant-dollar commercial mortgage loans, constant-dollar international lending contracts, constant-dollar notes, constant-dollar bonds and/or constant-dollar asset-backed securities (possibly including constant-dollar mortgage-backed securities). The currency underlying the constant-dollar loans, leases and investments may be U.S. dollars or any other currency. Any desired price index or other economic index may be used to adjust said currency.

The depository institution may create and/or deal in constant-dollar forward contracts based on constant-dollar currencies (e.g., the purchase or sale forward of a constant-euro deposit for a constant-U.S. dollar deposit), constant-dollar Eurodollar deposits, constant-dollar bonds, or other constant-dollar financial products. The depository institution may create and/or deal in other constant-dollar derivative financial products including constant-dollar swaps, constant-dollar options and constant-dollar swaptions.

In the process of any of said activities regarding constant-dollar financial products, the depository institution may connect the bank computer (130) to other computers in the system, or part thereof, of FIG. 1A or the like, including, but not limited to, some or all of the following: an investment creating computer (100), a servicing computer (102), an investment banker computer (104), a mortgage banker computer (106), a trading computer (108), a broker computer (110), a rating agency computer (112), a clearing computer (114), an accounting computer (116), an issuer computer (118), a reporting computer (120), an investor computer (122), an investment manager computer (124), an investment advisor computer (126), an investment company computer (128), a bank computer (130), an insurance computer (132), a pension fund computer (134), etc.

An insurance company (or re-insurance company) may connect an insurance computer (132) into the system, or part thereof, of FIG. 1A or the like, in order to: make constant-dollar loans; make constant-dollar investments (including possibly the illustrative constant-dollar mortgage-backed securities; and/or create and sell constant-dollar financial products. The constant-dollar financial products that the insurance company may create and sell include, but are not limited to, some or all of the following: constant-dollar insurance, constant-dollar re-insurance, constant-dollar whole life, constant-dollar universal life, constant-dollar variable life, constant-dollar annuities, constant-dollar fixed annuities, constant-dollar variable annuities, constant dollar guaranteed investment contracts, and constant-dollar separate accounts. The currency underlying the constant-dollar financial products may be U.S. dollars or any other currency. Any desired price index or other economic index may be used to adjust said currency.

The constant-dollar loans and investments that the insurance company (or re-insurance company) may make include, but are not limited to, some or all of the following: constant-dollar private-placement corporate bonds, constant-dollar mortgage loans, constant-dollar commercial mortgage loans, constant-dollar business loans, constant-dollar term loans, constant-dollar leases, constant-dollar loans, constant-dollar bonds, constant-dollar medium-term notes, etc. In doing this, the insurance computer (132) in the system, or part thereof, of FIG. 1A or the like, may also function as an investment-creating computer (100). The currency underlying the constant-dollar loans and investments may be U.S. dollars or any other currency. Any desired price index or other economic index may be used to adjust said currency.

In the process of any of said activities regarding constant-dollar financial products, the insurance company (or re-insurance company) may connect the insurance computer (132) to other computers in the system, or part thereof, of FIG. 1A or the like, including, but not limited to, some or all of the following: an investment creating computer (100), a servicing computer (102), an investment banker computer (104), a mortgage banker computer (106), a trading computer (108), a broker computer (110), a rating agency computer (112), a clearing computer (114), an accounting computer (116), an issuer computer (118), a reporting computer (120), an investor computer (122), an investment manager computer (124), an investment advisor computer (126), an investment company computer (128), a bank computer (130), an insurance computer (132), a pension fund computer (134), etc.

A pension fund may connect a pension fund computer (134) into the system, or part thereof, of FIG. 1A or the like, in order to research, purchase, hold, and/or sell constant-dollar financial products. If the pension fund invests predominantly in private constant dollar financial products it is a constant-dollar pension fund and may create constant-dollar pensions. In doing this, the pension fund computer (134) in the system, or part thereof, of FIG. 1A or the like, may also function as an investment-creating computer (100).

In the process of any of researching, holding, and/or selling constant-dollar financial products, the pension fund may connect the pension fund computer (134) to other computers in the system, or part thereof, of FIG. 1A or the like, including, but not limited to, some or all of the following: an investment creating computer (100), a servicing computer (102), an investment banker computer (104), a mortgage banker computer (106), a trading computer (108), a broker computer (110), a rating agency computer (112), a clearing computer (114), an accounting computer (116), an issuer computer (118), a reporting computer (120), an investor computer (122), an investment manager computer (124), an investment advisor computer (126), an investment company computer (128), a bank computer (130), an insurance computer (132), a pension fund computer (134), etc.

Any of the entities in the system, or part thereof, of FIG. 1A or the like, and/or their accounting firms may desire to account for their involvement with constant-dollar financial products, thus connecting an accounting computer (116) into the system, or part thereof, of FIG. 1A or the like.

Data generated by the investment creating computer (100) regarding the private constant-dollar financial product may be shared with other computers. The investment creating computer (100) may have other functions in addition to creating constant-dollar financial product. Possibilities include, but are not limited to, being an investment banker computer (104), a mortgage banker computer (106), a broker computer (108), an issuer computer (118), a reporting computer (120), an investor computer (122), an investment company computer (128), a bank computer (130), an insurance computer (132), and/or a pension fund computer (134).

Any of the computers in the system, or part thereof, of FIG. 1A or the like, may receive and store private, constant-dollar financial product data and cooperate in computing a constant dollar to nominal dollar conversion for the financial product, with the output of each computer reflecting the respective needs of the user or users of the computer. The conversion of constant-dollar financial product data to nominal dollar financial product data may be updated, stored, retrieved and shared as interest accrues, payments become due and/or new data is received, including for example new data on the price index and/or current market prices and real (constant-dollar) rates of return.

In another illustrative example, consider a financing and leasing company that uses private constant-dollar financial products to finance its operations and the operations of its subsidiaries, including some combination of: constant-dollar debentures, constant-dollar subordinated debentures, constant-dollar capital notes, constant-dollar income bonds, constant-dollar medium-term notes, constant-dollar asset-backed securities, constant-dollar mortgage-backed securities, constant-dollar pass-through securities, constant-dollar preferred stock, constant-dollar limited-liability partnership units, and constant-dollar preferred-return LLC (Limited Liability Company) units. In so doing, the computer of the finance and leasing company and/or the computers of its subsidiaries may be connected into the system, or part thereof, of FIG. 1A or the like, and one, some or all may function as issuer computers (118) in the system, or part thereof, of FIG. 1A or the like.

The underlying currency of the constant-dollar financing instruments may be U.S. dollars or any other currency. The index used to adjust the currency units may be any desired price index or other economic index.

The finance and leasing company may use the funds raised through the sale of the above private constant-dollar financial products to fund constant dollar loans, constant-dollar leases and other constant-dollar investments including, but not limited to, some combination of:

1. Constant-dollar mortgages.
2. Constant-dollar construction loans.
3. Constant-dollar residential mortgages, where the mortgage or deed of trust securing the note is a mortgage or deed of trust on a 1 to 4 family residential property.
4. A constant-dollar reverse loan, especially a constant-dollar reverse mortgage which enables a consumer to tap the equity in their residence by receiving payments of constant purchasing power amounts, with the resulting constant-dollar loan being repaid through the sale of the residence at some defined point
5. Constant-dollar commercial mortgages, where the mortgage or deed of trust securing the note is a mortgage or deed of trust on commercial property including office, retail, industrial, multi-family residential, and mobile-home properties.
6. Constant-dollar second mortgage or home-equity loans.
7. Constant-dollar second mortgage or deed-of-trust financing for commercial properties.
8. Constant-dollar personal loans.
9. Constant-dollar auto loans.
10. Constant-dollar vehicle loans.
11. Constant-dollar loans to finance consumer durables.
12. Constant-dollar leases.
13. Constant-dollar leases to finance automobiles.
14. Constant-dollar leases to finance consumer durables.
15. Constant-dollar leases to finance boats or ships.
16. Constant-dollar leases to finance business property.
17. Constant-dollar leases to finance aircraft, aircraft engines, airframes, combinations thereof, railroad rolling stock, trucks, buses, trams, trollies or lorries.
18. Constant-dollar leases to real property.
19. Constant-dollar leveraged-leases where the lessor finances a large portion of the purchase price of the asset with a nonrecourse constant-dollar loan that is secured by a first claim on the leased asset.
20. Constant-dollar business loans.
21. Constant-dollar term loans.
22. Constant-dollar notes.
23. Constant-dollar international lending contracts.
24. Constant-dollar bonds.
25. Constant-dollar fully-amortizing bonds.
26. Constant-dollar private placement bonds.
27. Constant-dollar public issue bonds.
28. Constant-dollar medium-term notes, which are constant-dollar bonds (that can be of any maturity, in spite of the name) that are issued on a continuing basis over time rather than through the batch process of traditional underwriting.
29. Constant-dollar debentures.
30. Constant-dollar subordinated debentures.
31. Constant-dollar capital notes.
32. Constant-dollar mortgage bonds.
33. Constant-dollar equipment trust certificates.
34. Constant-dollar asset-backed securities.
35. Constant-dollar mortgage-backed securities.
36. Constant-dollar preferred stock.
37. Constant-dollar fully-amortizing preferred stock.
38. Constant-dollar limited partnership units.
39. Constant-dollar preferred-return LLC (Limited Liability Company) units.
40. Constant-dollar income bonds, where the issuing organization makes the promised real (purchasing power) payment only if it has income sufficient to make the payment. Payments that are not paid may cumulate with or without compounding (payment of interest on interest).

In so doing, the computer of the finance and leasing company and/or the computers of its subsidiaries may function as investment-creating computers (100) in the system, or part thereof, of FIG. 1A or the like. The underlying currency of the constant-dollar investments may be U.S. dollars or any other currency. The index used to adjust the currency units may be any desired price index or other economic index The finance and leasing company may utilize constant-dollar derivative products, including possibly constant-dollar forwards, constant-dollar futures, constant-dollar swaps, constant-dollar swaptions, and/or constant-dollar options to assist in managing its risk.

In the process of any of its activities regarding constant-dollar financial products, the finance and leasing company may connect the finance and leasing company computer to other computers in the system, or part thereof, of FIG. 1A or the like, including, but not limited to, some or all of the following: an investment creating computer (100), a servicing computer (102), an investment banker computer (104), a mortgage banker computer (106), a trading computer (108), a broker computer (110), a rating agency computer (112), a clearing computer (114), an accounting computer (116), an issuer computer (118), a reporting computer (120), an investor computer (122), an investment manager computer (124), an investment advisor computer (126), an investment company computer (128), a bank computer (130), an insurance computer (132), a pension fund computer (134), etc.

The finance and leasing company may engage the services of an investment banker in order to facilitate raising funds through the issuance of private constant-dollar financial products by the parent company and its subsidiaries. The functions of the investment banker may include: 1) providing financial advice regarding the structuring and timing of financing issues; and/or, 2) marketing and distributing the securities on a best efforts or fully underwritten basis.

In the process carrying out its functions, the investment banker may connect the investment banker computer (104) to some combination of the issuer computer (118), a reporting computer (120), a broker computer (110), a trading computer (108), a servicing computer (102), a clearing computer (114), an investment advisor computer (126), an investment manager computer (124), an investor computer (122), an investment company computer (128), a rating agency computer (112), a bank computer (130), an insurance computer (132), a pension fund computer (134), and/or other computers such as a broker/dealer computer or a broker's broker computer.

In another illustrative example, consider a nonfinancial corporation that uses private constant-dollar financial products to finance its operations and the operations of its subsidiaries, including, but not limited to, some combination of: constant-dollar debentures, constant-dollar subordinated debentures, constant-dollar capital notes, constant-dollar income bonds, constant-dollar medium-term notes, constant-dollar asset-backed securities, constant-dollar commercial mortgage loans, constant-dollar mortgage bonds, constant-dollar equipment trust certificates, constant-dollar leases, constant-dollar leveraged leases, constant-dollar preferred stock, constant-dollar limited-liability partnership units, and/or constant-dollar preferred-return LLC (Limited Liability Company) units. In so doing, the computer of the nonfinancial corporation and/or the computers of its subsidiaries may function as issuer computers (118) in the system, or part thereof, of FIG. 1A or the like.

The currency underlying the constant-dollar financing products may be U.S. dollars or any other currency. The index used to adjust the currency units may be any desired price index or other economic index.

The nonfinancial corporation may utilize constant-dollar derivative products, including possible constant-dollar forwards, constant-dollar futures, constant-dollar swaps, constant-dollar swaptions, and/or constant-dollar options to assist in managing its risk.

In the process of any of its activities regarding constant-dollar financial products, the nonfinancial corporation may connect the nonfinancial corporation computer to other computers in the or part thereof, of FIG. 1A or the like, including, but not limited to, some or all of the following: an investment creating computer (100), a servicing computer (102), an investment banker computer (104), a mortgage banker computer (106), a trading computer (108), a broker computer (110), a rating agency computer (112), a clearing computer (114), an accounting computer (116), an issuer computer (118), a reporting computer (120), an investor computer (122), an investment manager computer (124), an investment advisor computer (126), an investment company computer (128), a bank computer (130), an insurance computer (132), a pension fund computer (134), etc.

The nonfinancial corporation may engage the services of an investment banker in order to facilitate raising funds through the issuance of private constant-dollar financial products by the parent company and its subsidiaries. The functions of the investment banker may include: 1) providing financial advice regarding the structuring and timing of financing issues; and/or, 2) marketing and distributing the securities on a best efforts or fully underwritten basis.

In the process of carrying out its functions, the investment banker may connect the investment banker computer (104) to some combination of: the issuer computer (118), a reporting computer (120), a broker computer (110), a trading computer (108), a servicing computer (102), a clearing computer (114), an investment advisor computer (126), an investment manager computer (124), an investor computer (122), an investment company computer (128), a rating agency computer (112), a bank computer (130), an insurance computer (132), a pension fund computer (134), and/or other computers such as a broker/dealer computer or a broker's broker computer.

The nonfinancial corporation may find that, by eliminating uncertainty regarding the real (constant-dollar) amount of future lease payments, constant-dollar leveraged-lease financing offers it long-term, low-cost, on or off balance-sheet financing that would otherwise not be available.

As an illustration of a possible example of constant-dollar leveraged-lease financing, consider a nonfinancial corporation that owns gas pipelines. The pipelines have a value and ability to generate ongoing real cash flows that is independent of the nonfinancial corporation that owns the pipelines. Using the pipelines as collateral for secured financing debt financing (e.g., constant-dollar mortgage bonds) may have a limited ability to improve the corporation's credit rating and reduce the cost of its borrowing because of the risk of the pipelines being tied up in Chapter 11 bankruptcy proceedings with no payments to the bondholders and the possibility of losing some or all of the protection of their first claim on the pipelines. Plus the pipelines and bonds will still appear on the balance sheet of the corporation.

The corporation may, through the use of constant-dollar leveraged-lease financing, unlock the value of its pipeline holdings and lock-in long-term, low-cost, on or off balance-sheet financing while continuing to control the operation of the pipelines indefinitely. To do this, the corporation may engage the services of an investment banker, commercial bank or other funding source that arranges leveraged-lease financing. The investment banker, commercial bank or other funding source may arrange for a sale/lease-back buyer of the pipelines and a source of long-term, fully-amortizing, nonrecourse constant-dollar financing to finance the purchase by the lessor. The corporation may sell the pipelines to the lessor and lease them back using a constant-dollar operating lease that includes an unlimited number of renewal options at the fixed real lease payment. The lessor may borrow 90% of the purchase price of the pipelines using a long-term, fully-amortizing, nonrecourse constant-dollar loan secured by first claim on the pipelines. The lessor may place the leased pipelines in a bankruptcy proof subsidiary in order to protect the interests of the lenders. The lenders may be some combination of institutional investors including insurance companies, investment companies and pension funds.

In the process carrying out its functions, the investment banker, commercial bank or other funding source that is arranging the leveraged-lease financing may connect the investment banker computer (104), bank computer (130) or other funding source computer to some combination of: the (lessee) issuer computer (118), the (lessor) issuer computer (118); a reporting computer (120), an investment banker computer (104); a broker computer (110), a trading computer (108), a servicing computer (102), a clearing computer (114), an investment advisor computer (126), an investment manager computer (124), an investor computer (122), an investment company computer (128), a rating agency computer (112), a bank computer (130), an insurance computer (132), a pension fund computer (134), and/or other computers such as a broker/dealer computer or a broker's broker computer.

In another illustrative example, consider a municipal government unit that uses private constant-dollar financial products to finance its operations and/or the operations of its agencies, including some combination of: constant-dollar general-obligation bonds, constant-dollar revenue bonds, constant-dollar tax-exempt bonds, constant-dollar taxable bonds, constant-dollar double barrel bonds, constant-dollar leases and constant-dollar leveraged leases. In so doing, the computer of the municipal governmental unit may function as issuer computer (118) in the system, or part thereof, of FIG. 1A or the like.

In the process of financing with constant-dollar financial products, the municipal government unit may connect the municipal government unit to other computers in the system, or part thereof, of FIG. 1A or the like, including, but not limited to, some or all of the following: an investment creating computer (100), a servicing computer (102), an investment banker computer (104), a mortgage banker computer (106), a trading computer (108), a broker computer (110), a rating agency computer (112), a clearing computer (114), an accounting computer (116), an issuer computer (118), a reporting computer (120), an investor computer (122), an investment manager computer (124), an investment advisor computer (126), an investment company computer (128), a bank computer (130), an insurance computer (132), a pension fund computer (134), etc.

The municipal government unit may engage the services of an investment banker in order to facilitate raising funds through the issuance of private constant-dollar financial products by the parent company and its subsidiaries. The functions of the investment banker may include: 1) providing financial advice regarding the structuring and timing of financing issues; and/or, 2) marketing and distributing the securities on a best efforts or fully underwritten basis.

In the process of carrying out its functions, the investment banker may connect the investment banker computer (104) to some combination of the issuer computer (118), a reporting computer (120), a broker computer (110), a trading computer (108), a servicing computer (102), a clearing computer (114), an investment advisor computer (126), an investment manager computer (124), an investor computer (122), an investment company computer (128), a rating agency computer (112), a bank computer (130), an insurance computer (132), a pension fund computer (134), and/or other computers such as a broker/dealer computer or a broker's broker computer.

In still another illustrative example, consider a government-sponsored enterprise such as the Federal National Mortgage Association (Fannie Mae) or the Federal National Mortgage Corporation (Freddie Mac) that uses the system, or part thereof, of FIG. 1A or the like, to obtain and/or finance constant-dollar residential mortgages. Use of the system, or part thereof, of FIG. 1A or the like, to obtain and/or finance constant-dollar residential mortgages could, by eliminating inflation risk, reducing inflation risk, and stabilizing repayment rates, significantly reduce the risk that presently afflicts the operations of Fannie and Freddie and predominantly eliminate their need for complex, costly and risky hedging strategies. In addition, constant-dollar residential mortgages are more affordable for consumers than are nominal-dollar fixed-rate mortgages or adjustable-rate mortgages (ARMs) and may reduce default risk, especially in comparison to ARMs.

In the process of buying constant-dollar residential mortgages, Fannie or Freddie may connect their computer to the computers of mortgage originators, including a (mortgage) broker computer (110), a mortgage banker computer (106), a bank computer (130) and/or other computers. Fannie or Freddie may finance their purchase of constant-dollar residential mortgages using some combination of: constant-dollar agency bonds, constant-dollar agency notes, constant-dollar mortgage pass-through securities, and/or constant-dollar mortgage-backed securities.

In the process of financing its purchases of constant-dollar residential mortgages, Fannie or Freddie may act as its own investment banker, auctioning its constant-dollar financing securities and connecting its computer to some combination of: a reporting computer (120), a broker computer (110), an investment banker computer (104), a trading computer (108), a servicing computer (102), a clearing computer (114), an investment advisor computer (126), an investment manager computer (124), an investor computer (122), an investment company computer (128), a rating agency computer (112), a bank computer (130), an insurance computer (132), a pension fund computer (134), and/or other computers such as a broker/dealer computer or a broker's broker computer.

In a further embodiment of the present invention, the servicing computer (102) of the system, or part thereof, of FIG. 1A or the like, includes a computer-aided process for administering and enforcing the agreements governing private constant-dollar financial instruments. A process (illustrative, not limiting) is provided in FIGS. 2, 2A, 2B, 2C, 2D and 2E.

The fixed real (purchasing power) payments of constant-dollar financial instruments eliminate inflation risk, which may facilitate clear financing agreements and/or allow the computer-aided process for administering and enforcing the agreements to reduce or eliminate the risk of expensive, time consuming and lose-lose bankruptcy proceedings.

Fixed real (purchasing power) cash flows eliminate inflation risk and may facilitate clear financing agreements because: 1) final users of funds are financing real assets whose real (purchasing power) cash flows match up best with fixed real (purchasing power) payments; and, 2) final providers of funds are funding future real (purchasing power) expenditures that are purchasing power needs. In contrast, nominal dollar financing instruments specify future cash flows in terms of dollars of unknown purchasing power, which introduces inflation risk and may make the financing agreements unclear for both final users and final providers of funds.

The computer-aided process for administering and enforcing the agreements governing constant-dollar financial instruments may replace the bankruptcy process with a computer-aided process for enforcing the agreements, renegotiating the agreements and, when appropriate, liquidating the assets of a failed firm. This portion of the computer-aided process may replace the costly, time-consuming, lose-lose process of bankruptcy with an efficient, negotiated, win-win process that recognizes the shared interests of both funds providers and funds users in the success of the business—and their shared interest in terminating and/or liquidating a failed or failing enterprise as quickly and efficiently as possible.

The bankruptcy process may interact with the unclear agreements of the nominal financing (financing cash flows and returns specified in dollars of unknown purchasing power) to manifest increased risk and costs, including forced liquidations where the best interests of funds providers as well as users would have been better served by renegotiation of the financing agreements.

The further in the future the dollar cash flows are, the more uncertain their purchasing power may be. In response to this increased risk of longer maturities, funds providers may demand higher dollar returns and payments. Funds users may respond to the higher expense of longer-term financing by borrowing shorter term, often such a short term that their borrowings can only be paid off by rolling them over (refinancing). Shorter maturities result in higher current payments, increasing the probability that the user will not be able to make the payments and be forced into costly bankruptcy proceedings. Or the user may not be able to roll over the maturing financing due to some combination of difficult market conditions and temporary financial strain, thus further increasing the risk of bankruptcy. In the event that bankruptcy does occur, the purchasing power risk of future dollar payments may increase the tendency to seek money now rather than waiting. This pressure for cash now, together with the costs and delays inherent in the bankruptcy process, may increase realized losses for both providers and users of funds.

Other problems with the bankruptcy process for enforcing financing agreements include: 1) its all-or-nothing nature; and, 2) the risk that the agreements protecting the interests of providers who chose a lower promised return in order to receive greater security will be overturned during the proceedings. The all-or-nothing nature of bankruptcy proceedings means that senior creditors will cease receiving payments until the costly, time-consuming process comes to an end, even if the funds user was continuing to generate sufficient cash flow to pay their claims. In addition, they may be forcefully relegated to second position behind the providers of new, debtor-in-possession financing. Finally, the final agreement may take some of the cash flows that legally belong to them based on the original financing agreements, and distribute those funds to those with junior claims.

The computer-aided process for administering and enforcing the agreements of constant-dollar financial instruments may serve as an advantageous replacement for the costly, time-consuming, lose-lose bankruptcy process. The availability of this attractive replacement may makes it possible for the providers and users to mutually agree to chose this new process and forego reliance on the bankruptcy process. Making this choice for all of its financing will make any entity, regardless of its legal form, bankruptcy remote (i.e., the probability of expensive, time-consuming, lose-lose bankruptcy proceedings becomes very small).

Bankruptcy remote does not mean failure proof. In the event of default, the process that will be utilized to resolve the default will be the computer-aided process rather then the bankruptcy process.

Another possibility is this computer-aided process for administering and enforcing the agreements of constant-dollar financial instruments is that it may enable constant-dollar financial instruments that are structured as preferred equity instruments to perform the financial function of debt instruments without being debt instruments, thus allowing cultures (e.g., Islamic cultures) that prohibit the use of debt financing to enjoy the benefits of a financial system that offers both users and providers of funds a full range of risk/return options.

In addition to making it possible to use constant-dollar financial instruments to create a complete, modern financial system with a full range of risk/return options for Islamic countries, this computer-aided process for administering and enforcing the agreements of constant-dollar financial instruments may open up the ability to create a full-range (of risk/return options) financing for cooperatives and not-for-profit organizations—up to and including the functional (for purposes of raising capital) common equity. This may assist in financing the growth of existing cooperatives and not-for-profits, and increase the opportunities for financing the start-up of new cooperatives and not-for-profits.

The ability to use junior subordinated constant-dollar financial instruments to raise the "equity level" funds that can presently be raised only through the sale of common equity interests (common stock) to providers of funds may open up the possibility of a different financial structure for business. In this different financial structure, the ownership of common equity interests (common stock) and, therefore, the ownership and control of the firm, is separated from the financing of the firm. Ownership and control rest with the active workers (and, in some cases, customers) who meet the agreed upon initial (e.g., successful completion of a probationary period) and ongoing (e.g., keeping agreements and honoring commitments) conditions for participation in ownership and governance.

The present structure for financing business relies on ownership interests in the business (common equity interests or shares of common stock) as the foundation financing. This foundation of common equity is then supplemented with debt financing. Because debt financing is less risky for the provider of funds (and interest payments are tax deductible, but dividend payments are not), it is less expensive than equity financing. However, the use of debt creates the risk of default, expensive lose-lose bankruptcy proceedings and the possible liquidation of the firm. The need to limit this risk restricts the amount of debt financing that a firm is willing and able to utilize.

Providers of foundation financing who invest in the common equity interests (common stock) of businesses have last (residual) claim on the income and assets of the businesses (i.e., their claim is on the profits of the businesses). They are owners of the businesses and their ownership rights are their only source of enforcing their claim on profits and receiving a return on their investment.

Therefore, the profits of businesses belong to providers of funds who have invested in the ownership interests (common stock) of the businesses. The owners (providers of funds) protect their claim on the profits through the exercise of their ownership rights—voting to select the top management of the businesses, who in turn select the middle managers who in turn select the workers. The result may be a hierarchical, top-down management structure for businesses that may restrict information flows rather than a network structure that facilitates optimal information exchange.

The present financial structure may have an impact on the organizational structure of the business. People can use information and communication technology to self-organize, but when they raise the funds to finance a business the use of the present financial structure may impose a formal top-down organizational structure on the business. The informal relationships between the founders may maintain a functioning network organizational structure for a period of time, thus supporting the initial vitality, adaptability and growth (all biological processes) of the enterprise. However, the success of the organization brings more people, which may increase the power of the formal, top-down organizational structure that was imposed by the use of the present financing structure. The result may be the loss of the power of the network organizational structure that gave the enterprise its initial vitality, adaptability, excitement and growth. Extraordinary managers and leaders may delay, but not eliminate, this loss.

The various embodiments suggested herein can make possible a different financial structure that complements and supports a network organizational structure that may assist businesses in achieving lasting success after a successful start-up. In an illustrative example of a different financial structure, the computer-aided process for administering and enforcing the agreements governing constant-dollar financial instruments makes it possible to separate the investment of funds from the ownership of common equity interests (common stock). The common stock, the ownership of the profits, and control of the business may then be distributed to active workers (and, in some cases, active customers) according to vesting and other agreements between those individuals who are, collectively, the enterprise. Because no money is paid for the acquisition of this common stock, no money is received for surrendering it upon leaving the enterprise (either voluntarily or involuntarily as a consequence of failure to abide by agreements).

All funds invested in the enterprise (including reinvested profits) result in the issuance of new constant-dollar financial instruments. Junior subordinated constant-dollar financial instruments (which may be structured as income bonds or as preferred equity interests, whichever works best for the particular organization) are used to raise the equity level financing that is the foundation of the higher priority claims of all of the other providers of funds. These junior subordinated constant-dollar financial instruments will have a real (purchasing power) claim on income and assets that is preferred to the last (residual) claim of the common equity interests (common stock) held by the active workers (and, in some cases, customers).

The promised real return on the junior subordinated constant-dollar financial instruments will normally be based on the historical long-term average returns on common stock (7% real for large stocks and 9% real for small stocks according to data provided by Ibbotson and Associates). Depending on risk, the junior subordinated constant-dollar financial instruments may offer a participation in profits beyond their promised return—a participation that may be capped at some agreed upon higher rate of real return.

The risk of these junior subordinated constant-dollar financial instruments may be less than the risk of traditional investments in common stock because: 1) active participation of workers as owners has been demonstrated to improve business performance (see the literature on Open Book Management); and, 2) worker compensation bears more of the cost of a business downturn (because ownership of the firm by the workers means that workers are the first to have their income fall as profits decline).

The computer-aided process for administering and enforcing the agreements of constant-dollar financial instruments may, when fully adopted for all of the financing of an enterprise, eliminate the risk of costly, time-consuming, lose-lose bankruptcy proceedings, thus benefiting both the enterprise and the investors who are financing the enterprise. Use of the process by even a part of the financing of the enterprise will reduce the risk of bankruptcy proceedings—and the risk of default for holders of senior claims because defaults regarding junior claims can often be resolved without affecting the payments to those with senior claims.

In addition to reducing or even eliminating the risk of costly, time-consuming, bankruptcy proceedings, the computer-aided process for administering and enforcing the agreements of constant-dollar financial instruments facilitates a shift from an adversarial relationship with investors providing financing to a cooperative relationship that manifests the common interests of all parties in the success of the enterprise.

A further possible benefit, depending on the implementation, of the separation of ownership and financial investment may occur when customers who are actively involved in the business become the major owners of the business. For example, an apartment complex that is majority owned by the (current) tenants and minority owned by the (current) management and maintenance workers. Increased tenant satisfaction, reduced turnover, lower vacancies, reduced costs and improved financial performance may result. A preliminary analysis conducted by the inventors suggests that tenant owners might receive annual profits equal to or greater than one month's rent.

In another possible example, consider a business that is selling a new product whose cost is expected to decline significantly as production increases (the learning curve effect) such as solar energy (e.g., solar cells that produce electricity and/or hydrogen from water). This new financing structure allows the initial customers, who pay a higher price, to share in the profits that may be produced as production increases, prices fall, and sales increase, creating a virtuous cycle of falling costs and rising revenues. In one possible structure, the ownership percentage of the firm that is held by customers would be allocated according to the present value of past real (purchasing power) payments made to the firm by customers, calculated at some agreed upon real rate of interest. The rewards for early purchase (at a higher price) may be further increased by applying a higher real rate of interest to early purchasers, thus increasing the present value of their past real payments. This structure may facilitate a more rapid growth of new technologies such as solar cells.

The computer-aided process for administering and enforcing the agreements of constant-dollar financial instruments may make it possible for preferred-equity instruments to produce the same (or superior) range of risk/return options that can be produced with debt instruments. As a result, the process may enable cultures (e.g., Islamic) that prohibit debt financing and the payment of interest to create modern financial systems that offer a full range of risk/return options.

At the equity capital end of the risk/return spectrum, the computer-aided process for administering and enforcing the agreements of constant-dollar financial instruments may make it possible to create constant-dollar income bonds and/or preferred equity instruments that offer common equity levels of real returns with less risk and can be used to replace the use of common equity (common stock) in financing. As a result, it may become possible: 1) for organizations that cannot use common stock financing (cooperatives, not-for-profits, etc.) to offer securities to investors that can take the place of the common equity funds that they otherwise could not raise; and, 2) for for-profit enterprises to separate their ownership from the investment of funds, creating a different financial structure that facilitates a network organizational structure.

In an embodiment where the computer-aided process for administering and enforcing the agreements of constant-dollar financial instruments has two (for example) components (FIG. 2, steps 400 and 402), the process followed for a new financing and the process for the ongoing administration and enforcement of the agreements governing existing financing.

For a new financing, the terms of the proposed financing, including all agreements/covenants are entered (step 404). The terms and agreements of all present financings are entered (step 406). It is determined if the terms/agreements of the proposed financing are consistent with/allowed by the agreements/covenants of the existing financing (step 408). If the new financing is not consistent with the existing financing (step 410), the terms and agreements of the proposed financing are modified (step 412) and the system goes back to step 408. If the proposed financing is consistent, the new financing is approved (step 414) and the system goes to step 402, administration and enforcing of agreements governing existing financing.

In the administration and enforcing of agreements governing existing financing, all terms and agreements/covenants of all existing financing are entered (FIG. 2A, step 450). Current financial data and all other data relevant to the terms and agreements/covenants are entered (step 452). If not already entered, all historical financial and other data relevant to the terms and agreements/covenants of the existing financing are entered (step 454). The embodiment determines whether or not any of the terms and agreements/covenants of the existing financing are being violated (step 456). If no violations exist (step 458), there is output (step 460) of a status report (or signal), which can be sent to all holders of existing financing instruments and their representatives.

If violations exist, the system determines (FIG. 2B, step 462) which holders of existing financing instruments are affected by the violation and/or are to be notified according to relevant terms and agreements/covenants. There is output (step 464) of a signal or a status report, which can be sent to all holders of financial instruments that are not affected and do not require notification of the violations. Output (step 466) notice or a signal of the violation, preferably with its relative severity to all other holders of financial instruments, is communicated, e.g., together with a status report or signal including all relevant financials and other data.

It is determined whether the violations (step 468) might lead to bankruptcy proceedings if not rectified. If bankruptcy proceedings are possible (step 470), it is determined (step 472) whether or not the relevant holders of financial instruments are willing to forgo bankruptcy proceedings at present. If not, then the enterprise proceeds to bankruptcy proceedings. If bankruptcy proceedings are not possible (step 470) according to the agreements/covenants or if they are possible but the relevant holders decide to forgo bankruptcy proceedings for now (steps 470 and 472), the system retrieves (FIG. 2C, step 474) data on actions that have been taken to resolve similar violations by similar enterprises in the past and the results of these actions.

An electronic or physical meeting of the affected holders of financial instruments and the representatives with the management of the issuing entity is hosted (step 476). If the meeting does not reach agreement (step 478) on a course of action, an expert facilitator or conflict resolution expert is brought into the process (step 480). If agreement is still not reached (step 482), the option of liquidation is explored relative to all other options (step 486). The providers of financing then decide (step 488) either to proceed with liquidation or they agree on a course of action for resolving the violations (step 490).

If and when a course of action for remedying the violation has been decided upon, the terms and agreements/covenants regarding the course of action (which may involve modifications of previous terms and agreements/covenants based on mutual consent) are entered and all parties are notified of the terms and agreements/covenants (step 484). Then (FIG. 2D, step 492) monitors the actions taken, results of the actions, and whether or not the violations are remedied and the terms and agreements/covenants (as modified, if relevant) are being satisfied. The results are stored in the database for further reference and learning. If the violations are remedied within the agreed upon time frame (step 494), then the logic returns to step 462 to continue its ongoing monitoring process. If the violations are not remedied within the agreed upon time frame, the system returns to step 452 to begin again the process for remedying violations.

In the event that holders of the financing instruments decide that liquidation is the best course of action (FIG. 2B, step 488), the system notifies (FIG. 2E, step 496) all parties of the liquidation, the expected time table, the expected proceeds, and the amounts that each holder of the various instruments may receive. The logic monitors (step 498) the liquidation process and, if appropriate, appoints a professional liquidator to carry out the liquidation. The logic distributes (step 500) the proceeds from the liquidation according to the agreements/covenants governing the instruments.

In still another further embodiment, the rating agency computer (112) of the system, or part thereof, of FIG. 1A or the like, includes a computer-aided process for estimating the credit risk of private constant-dollar financial instruments. The process is illustrated in FIGS. 3, 3A and 3B.

The fixed real (net of inflation) payments of constant-dollar financial instruments eliminate inflation risk and may facilitate the process of estimating credit risk. A computer-aided process for estimating the credit risk of constant-dollar financial instruments may facilitate the determination of possible low-cost, accurate credit ratings for businesses, and financial intermediaries, of all sizes. This may: 1) give smaller and medium-sized businesses and financial intermediaries access to more funds on better terms; and, 2) allow smaller and medium-sized providers of funds and financial intermediaries to access a much wider range of investments with superior risk/return tradeoffs. It may improve the pricing of financing and enable the financing process to move more funds to final users who are able to invest at higher rates of returns and thus make the financing process more efficient (lower cost) and less risky.

This computer-aided process for estimating the credit risk of private constant-dollar financial instruments may significantly improve the quality and usefulness of credit ratings for all businesses, including large businesses, as well as producing low-cost, accurate credit ratings for smaller and medium-sized businesses and financial intermediaries. Over time, this computer-aided process may interact synergistically with the computer-aided process for administering and enforcing the agreements governing constant-dollar financial instruments. That process for enforcing and administering financing agreements may create a growing database of business financial performance that could be used by the computer-aided process for estimating credit risk to continuously improve its estimates of credit risk. The improved estimates of credit risk may in turn feed back into the process for administering and enforcing financing agreements, giving both providers and users of funds better information regarding the choices for renegotiating the financing—or liquidating the business—in the event of default on the agreements regarding one or more of the classes (according to relative priority of claims on income and assets) of constant-dollar financial instruments.

At present, credit ratings for financial instruments are produced by one or more of three major credit rating firms—S&P, Moody, and Fitch. Each firm uses its own propriety, confidential process for rating credit risk. They each also attempt to reduce credit risk to a single, linear scale. The propriety processes and single scale of these ratings limits the quality and usefulness of these ratings. Also, the confidential processes may or may not include a feedback process for improving the quality of credit ratings. And they are expensive, effectively limiting the use of ratings to issues sufficiently large to economically absorb the fixed cost of a rating.

A computer-aided process for estimating the credit risk of private constant-dollar financial instruments can address (depending on the implementation) these problems by: 1) using open standards that clearly establish the basis for every rating; 2) using an automated process to dramatically reduce the cost of a rating; 3) creating an explicit feedback loop that is used to continually improve the quality of the ratings; and, 4) expressing the rating as a set of numbers that may collectively provide a more complete assessment of credit risk.

The credit risk output of computer-aided process may include: 1) the mean expected loss; 2) the variability of the expected loss; 3) the correlation of the expected loss with variations in economic activity in general; and/or, 4) the probability of default.

In contrast to a credit risk focus on only the last number, the probability of default is herein accommodated. However, the actual losses that result from default may vary widely, from a very small amount to virtually 100%. Knowing the mean expected loss facilitates the accurate pricing of financial instruments (pricing is relative to some benchmark that is assumed to be effectively "risk-free"—typically US government securities). The promised yield of the instrument (which may or may not include a participation in earnings) may be set to equal the benchmark return plus the mean expected loss plus a risk premium. The size of the risk premium may depend on: 1) the variability of the expected loss; 2) the correlation of the expected loss with general economic activity; and, 3) the probability of default.

The variability of the expected loss measures the standalone risk. However, it is generally asserted that only systematic risk—risk that cannot be diversified away—counts in the pricing process. Risk that is not associated with general economic fluctuations can be diversified away. The product of the variability of expected loss and the correlation of expected loss with variations in economic activity in general provides a measure of systematic risk that may be used to determine the risk premium.

The probability of default may also enter into the determination of the risk premium because default results in a delay of promised payments, which can create costs and losses for holders of the instruments (how large and how important depends on the individual financial circumstances). Use of the computerized process for administering and enforcing the agreements governing constant-dollar financial instruments may reduce the costs and losses associated with default by: 1) sometimes limiting delays in payments to holders of junior financial instruments who are (or should be) better positioned to accept delays in payments; 2) reducing the expected loss; 3) reducing the costs of resolving defaults; and, 4) reducing the time to resolve defaults.

The fixed real (purchasing power) payments of constant-dollar financial instruments eliminate inflation risk and facilitate accurate estimates of the mean expected loss, the variability of the expected loss, the correlation of expected loss with general economic activity, and the probability of default. Eliminating inflation risk eliminates the risk of loss due to unanticipated inflation. The losses suffered by investors in nominal debt instruments as a result of unanticipated inflation have historically been much greater than the losses that they have suffered as a result of defaults. Also, the use of constant-dollar financial instruments may reduce the incentive to use shorter-term financing. Shorter-term financing may make default risk more difficult to predict as well as increasing default risk.

The computer-aided process for estimating the credit risk of private constant-dollar financial instruments can include three subcomponents (FIG. 3, steps 600, 602 and 604): 1) rating a new financing issue; 2) updating the rating on an outstanding financing; and, 3) developing and improving the rating algorithms.

Rating a new issue begins by retrieving (step 606) data on the issuer and all other data used in the rating algorithms. The logic determines (step 608) the issuer data that is useful but not known, requests the data from the issuer and enters it when received (step 610), retrieves the rating algorithms and calculates the ratings (step 612), and outputs the ratings (step 614).

The process of updating the rating on an outstanding financing begins by entering (FIG. 3A, step 616) all data received from the issuer and other sources. The system determines whether the issuer has provided all relevant data by the agreed upon date (step 618). If all data has not been provided as agreed (step 620), the system requests the data by a given date (step 622). If the data is not provided by the given date (step 624), the system notifies all relevant parties of the default (step 626). When the data has been received, the system retrieves (step 628) the rating algorithms and calculates the updated ratings (step 628) and outputs the updated ratings and distributes them to all relevant parties (step 630).

The process for developing and improving rating algorithms may begin by determining which measures are most relevant and valuable for investors in making their investment decisions. Assuming investors are acting according to the theory of investment decision making, the relevant measures might be: 1) the mean expected loss; 2) the variability of the expected loss; 3) the correlation of expected loss with general economic activity; and/or, 4) the probability of default (delay of promised payments).

Knowing the mean expected loss may make it possible to adjust the promised return for the expected loss, thus providing the investor with the mean expected real return, which equals the promised real return minus the expected real loss expressed as a percent of the investment.

The size of the actual loss may be quite different than the size of the mean expected loss. Investors may be concerned about how large the loss might be and how likely it is as well as the amount of the mean loss. The possible size of the loss may be measured by the variance of the expected loss. The larger the variance, the larger the possible loss and the more likely it is.

However, the variance of the expected loss measures stand-alone risk and diversified investors may eliminate some part of this risk through the diversification and may, therefore, care only about the risk that cannot be diversified away. The correlation of the expected loss with general economic activity may enable the diversified investor to determine systematic risk, that part of risk that cannot be diversified away. Systematic risk equals the variability of the expected loss times the correlation of expected loss times the variance of expected loss.

Investors that are counting on their investment earnings to pay current expenses may also be concerned about the probability of default as default may result in the delay and/or loss of promised payments.

However, users may have their own ideas regarding the risk measures that they desire. Therefore, the first step in the process is to consult with users (FIG. 3B, step 650) regarding the measures that they find most useful. This process of consulting with users regarding their needs and the usefulness of current measures will be repeated over time as users gain experience with the system.

The academic community and other researchers (step 652) can be engaged to search for better algorithms for estimating the measures of risk. Electronic and face-to-face forums are convened to share all data and results (step 654). The apparent best algorithms are chosen together with a set of competitor, or benchmark, algorithms (step 656). The best algorithms are used to estimate the published risk estimates (step 658). The competitor, or benchmark, algorithms are also used to make risk estimates and the data is stored in the database available to all researchers. Researchers test the results of the best algorithms and/or the competitor (benchmark) algorithms against actual loss experience (step 660). This information is then fed back into the process (step 662) to create a feedback loop of continuous improvement in the performance of the algorithms.

Although only a few exemplary embodiments have been described in detail above, those skilled in the art will readily appreciate that many modifications are possible in the exemplary embodiments without materially from the novel teachings and advantages herein. Accordingly, all such modifications are intended to be included within the scope defined by patent claims. In the claims, means-plus-function claims are intended to cover the structures described herein as performing the recited function and not only structural equivalents, but also equivalent structures. Thus, for example, although a nail and a screw may not be structural equivalents in that a nail employs a cylindrical surface to secure wooden parts together, whereas a screw employs a helical surface, in the environment fastening wooden parts, a nail and a screw may be equivalent structures.

The invention claimed is:

1. A multiple computer system to respectively specify a private, constant-dollar financial product, the system including:
- a first computer programmed to carry out steps including:
  - storing private, constant-dollar financial product data corresponding to a private, constant-dollar financial product;
  - storing nominal dollar data corresponding to said private, constant-dollar financial product data corresponding to said private, constant-dollar financial product;
- a second computer programmed to carry out steps including:
  - storing said private, constant-dollar financial product data;
  - storing said nominal dollar data corresponding to said private, constant-dollar financial product data;
  - storing additional data; and
- wherein
  - said computers cooperate, by using a communications system to communicate, such that at least one of said computers computes a constant dollar to nominal dollar conversion for the private, constant-dollar financial product from the data that is stored at said at least one of said computers, and each one of said computers is respectively programmed to use the data that is stored at the respective one of said computers to generate output respectively specifying the private, constant dollar financial product.

2. The computer system of claim 1, wherein one of said computers includes an investment-creating computer, and said output of said investment-creating computer further includes output specifying terms of the private, constant dollar financial product.

3. The computer system of claim 1, wherein one of said computers includes an investment banker computer, and said output of said investment banker computer further includes output specifying pricing of the private, constant dollar financial product.

4. The computer system of claim 1, wherein one of said computers includes a reporting computer, and said output of said reporting computer further includes output specifying records of the private, constant dollar financial product.

5. The computer system of claim 1, wherein one of said computers includes a rating agency computer, and said output of said rating agency computer further includes output specifying a rating of the private, constant dollar financial product.

6. The computer system of claim 1, wherein one of said computers includes a trading computer, and said output of said trading computer further includes output specifying a trade of the private, constant dollar financial product.

7. The computer system of claim 1, wherein one of said computers includes a broker computer, and said output of said broker computer further includes output specifying transactions data of the private, constant dollar financial product.

8. The computer system of claim 1, wherein one of said computers includes an investor computer, and said output of said investor computer further includes output specifying an order for the private, constant dollar financial product, the order associated with an investor.

9. The computer system of claim 1, wherein one of said computers includes a servicing computer, and said output of said servicing computer further includes output specifying payment data of the private, constant dollar financial product.

10. The computer system of claim 1, wherein one of said computers includes an issuer computer, and said output of said issuer computer further includes output specifying an order for the private, constant dollar financial product, the order associated with an issuer of the private, constant dollar financial product.

11. The computer system of claim 1, wherein one of said computers includes an accounting computer, and said output of said accounting computer further includes output specifying accounting data of the private, constant dollar financial product.

12. The computer system of claim 1, wherein one of said computers includes a pension fund computer, and said output of said pension fund computer further includes output specifying an order of the private, constant dollar financial product, the order associated with a pension fund.

13. The computer system of claim 1, wherein one of said computers includes an investment manager computer, and said output of said investment manager computer further includes output specifying an order for the private, constant dollar financial product, the order associated with an investment manager.

14. The computer system of claim 1, wherein one of said computers includes an investment company computer, and said output of said investment company computer further includes output specifying an order for the private, constant dollar financial product, the order associated with an investment company.

15. The computer system of claim 1, wherein one of said computers includes an investment adviser computer, and said output of said investment advisor computer further includes output specifying a recommendation of the private, constant dollar financial product.

16. The computer system of claim 1, wherein one of said computers includes an insurance computer, and said output of said insurance computer further includes output specifying an order of the private, constant dollar financial product, the order associated with insurance.

17. The computer system of claim 1, wherein one of said computers includes a bank computer, and said output of said bank computer further includes output specifying an order of the private, constant dollar financial product, the order associated with a bank.

18. The computer system of claim 1, wherein one of said computers includes a clearing computer, and said output of said clearing house computer further includes output specifying a clearing transaction data of the private, constant dollar financial product.

19. The computer system of claim 1, wherein one of said computers includes a mortgage banker computer, and said output of said mortgage banker computer further includes output specifying pricing of the private, constant dollar financial product, the pricing associated with mortgage banker.

20. The computer system of claim 1, wherein the private, constant dollar financial product comprises a loan.

21. The computer system of claim 1, wherein the private, constant dollar financial product comprises a reverse loan.

22. The computer system of claim 1, wherein the private, constant dollar financial product comprises a mortgage.

23. The computer system of claim 1, wherein the private, constant dollar financial product comprises a vehicle loan.

24. The computer system of claim 1, wherein the private, constant dollar financial product comprises an aircraft loan.

25. The computer system of claim 1, wherein the private, constant dollar financial product comprises a construction loan.

26. The computer system of claim 1, wherein the private, constant dollar financial product comprises a bond.

27. The computer system of claim 1, wherein the private, constant dollar financial product comprises a tax exempt bond.

28. The computer system of claim 1, wherein the private, constant dollar financial product comprises a business loan.

29. The computer system of claim 1, wherein the private, constant dollar financial product comprises insurance.

30. The computer system of claim 1, wherein the private, constant dollar financial product comprises an annuity.

31. The computer system of claim 1, wherein the private, constant dollar financial product comprises a defined contribution plan.

32. The computer system of claim 1, wherein the private, constant dollar financial product comprises a defined benefit plan.

33. The computer system of claim 1, wherein the private, constant dollar financial product comprises a pension plan.

34. The computer system of claim 1, wherein the private, constant dollar financial product comprises currency.

35. The computer system of claim 1, wherein the private, constant dollar financial product comprises a futures contract.

36. The computer system of claim 1, wherein the private, constant dollar financial product comprises an options contract.

37. The computer system of claim 1, wherein the private, constant dollar financial product comprises a forward.

38. The computer system of claim 1, wherein the private, constant dollar financial product comprises a swap.

39. The computer system of claim 1, wherein the private, constant dollar financial product comprises a derivative.

40. The computer system of claim 1, wherein the private, constant dollar financial product comprises a debenture.

41. The computer system of claim 1, wherein the private, constant dollar financial product comprises a deposit.

42. The computer system of claim 1, wherein the private, constant dollar financial product comprises a note.

43. The computer system of claim 1, wherein the private, constant dollar financial product comprises a certificate of deposit.

44. The computer system of claim 1, wherein the private, constant dollar financial product comprises an investment company share.

45. The computer system of claim 1, wherein the private, constant dollar financial product comprises an asset-backed security.

46. The computer system of claim 1, wherein the private, constant dollar financial product comprises an international lending contract.

47. The computer system of claim 1, wherein the private, constant dollar financial product comprises a trust.

48. The computer system of claim 1, wherein the private, constant dollar financial product comprises a real estate investment trust.

49. The computer system of claim 1, wherein the private, constant dollar financial product comprises a real estate mortgage investment conduit.

50. A multiple computer apparatus, the apparatus including:
a first computer programmed to carry out steps including:
storing private, constant-dollar financial product data corresponding to a private, constant dollar financial product;
storing nominal dollar data corresponding to said private, constant-dollar financial product data corresponding to said private, constant dollar financial product;
a second computer programmed to carry out steps including:
storing said private, constant-dollar financial product data;
storing said nominal dollar data corresponding to said private, constant-dollar financial product data; and
wherein said computers to cooperate by using a communications system to communicate between the computers so as to facilitate at least one of selling and servicing said private, constant dollar financial product and such that at least one of said computers computes a constant dollar to nominal dollar conversion for the private, constant-dollar financial product, and each one of said computers is respectively programmed to generate output, by using respective additional data and the stored data at each of said computers, which specifies said private, constant dollar financial product.

51. The apparatus of claim 50, wherein the steps of one of said computers further includes generating an instrument corresponding to the private, constant dollar financial product with one of said computers as one said output.

52. The apparatus of claim 50, wherein the steps of one of said computers further includes generating investment banking documentation corresponding to the private, constant dollar financial product with one of said computers as one said output.

53. The apparatus of claim 50, wherein the steps of one of said computers further includes generating financial reporting corresponding to the private, constant dollar financial product with one of said computers as one said output.

54. The apparatus of claim 50, wherein the steps of one of said computers further includes generating a rating for an instrument corresponding to the private, constant dollar financial product with one of said computers as one said output.

55. The apparatus of claim 50, wherein the steps of one of said computers further includes generating documentation of a trade of an instrument corresponding to the private, constant dollar financial product, the trade carried out by one of said computers, as one said output.

56. The apparatus of claim 50, wherein the steps of one of said computers further includes generating documentation of a brokerage transaction of an instrument corresponding to the private, constant dollar financial product, the brokerage transaction carried out by one of said computers, as one said output.

57. The apparatus of claim 50, wherein the steps of one of said computers further includes generating investor documentation corresponding to the private, constant dollar financial product as one said output.

58. The apparatus of claim 50, wherein the steps of one of said computers further includes generating servicing documentation corresponding to the private, constant dollar financial product as one said output.

59. The apparatus of claim 50, wherein the steps of one of said computers further includes generating issuer documentation corresponding to the private, constant dollar financial product as one said output.

60. The apparatus of claim 50, wherein the steps of one of said computers further includes generating issuer accounting documentation corresponding to the private, constant dollar financial product as one said output.

61. The apparatus of claim 50, wherein the steps of one of said computers further includes generating investor accounting documentation corresponding to the private, constant dollar financial product as one said output.

62. The apparatus of claim 50, wherein the steps of one of said computers further includes generating investment manager documentation corresponding to the private, constant dollar financial product as one said output.

63. The apparatus of claim 50, wherein the steps of one of said computers further includes generating investment fund documentation corresponding to the private, constant dollar financial product as one said output.

64. The apparatus of claim 50, wherein the steps of one of said computers further includes generating investment advisor documentation corresponding to the private, constant dollar financial product as one said output.

65. The apparatus of claim 50, wherein the steps of one of said computers further includes generating insurance documentation corresponding to the private, constant dollar financial product as one said output.

66. The apparatus of claim 50, wherein the steps of one of said computers further includes generating banking documentation corresponding to the private, constant dollar financial product as one said output.

67. The apparatus of claim 50, wherein the steps of one of said computers further includes generating clearing documentation corresponding to the private, constant dollar financial product as one said output.

68. The apparatus of claim 50, wherein the private, constant dollar financial product comprises a loan.

69. The apparatus of claim 50, wherein the private, constant dollar financial product comprises a reverse loan.

70. The apparatus of claim 50, wherein the private, constant dollar financial product comprises a mortgage.

71. The apparatus of claim 50, wherein the private, constant dollar financial product comprises a vehicle loan.

72. The apparatus of claim 50, wherein the private, constant dollar financial product comprises an aircraft loan.

73. The apparatus of claim 50, wherein the private, constant dollar financial product comprises a construction loan.

74. The apparatus of claim 50, wherein the private, constant dollar financial product comprises a bond.

75. The apparatus of claim 50, wherein the private, constant dollar financial product comprises a tax exempt bond.

76. The apparatus of claim 50, wherein the private, constant dollar financial product comprises a business loan.

77. The apparatus of claim 50, wherein the private, constant dollar financial product comprises insurance.

78. The apparatus of claim 50, wherein the private, constant dollar financial product comprises an annuity.

79. The apparatus of claim 50, wherein the private, constant dollar financial product comprises a defined contribution plan.

80. The apparatus of claim 50, wherein the private, constant dollar financial product comprises a defined benefit plan.

81. The apparatus of claim 50, wherein the private, constant dollar financial product comprises a pension plan.

82. The apparatus of claim 50, wherein the private, constant dollar financial product comprises currency.

83. The apparatus of claim 50, wherein the private, constant dollar financial product comprises a futures contract.

84. The apparatus of claim 50, wherein the private, constant dollar financial product comprises an options contract.

85. The apparatus of claim 50, wherein the private, constant dollar financial product comprises a forward.

86. The apparatus of claim 50, wherein the private, constant dollar financial product comprises a swap.

87. The apparatus of claim 50, wherein the private, constant dollar financial product comprises a derivative.

88. The apparatus of claim 50, wherein the private, constant dollar financial product comprises a debenture.

89. The apparatus of claim 50, wherein the private, constant dollar financial product comprises a deposit.

90. The apparatus of claim 50, wherein the private, constant dollar financial product comprises a note.

91. The apparatus of claim 50, wherein the private, constant dollar financial product comprises a certificate of deposit.

92. The apparatus of claim 50, wherein the private, constant dollar financial product comprises an investment company share.

93. The apparatus of claim 50, wherein the private, constant dollar financial product comprises an asset-backed security.

94. The apparatus of claim 50, wherein the private, constant dollar financial product comprises an international lending contract.

95. The apparatus of claim 50, wherein the private, constant dollar financial product comprises a trust.

96. The apparatus of claim 50, wherein the private, constant dollar financial product comprises a real estate investment trust.

97. The apparatus of claim 50, wherein the private, constant dollar financial product comprises a real estate mortgage investment conduit.

98. A multiple computer apparatus to support a private constant-dollar financial product, the apparatus including:
a first computer
storing private, constant-dollar financial product data corresponding to a private, constant dollar financial product and
storing nominal dollar data corresponding to said private, constant-dollar financial product data;
a second computer
storing said private, constant-dollar financial product data,
storing said nominal dollar data corresponding to said private, constant-dollar financial product data, and
storing data for said private constant-dollar financial product;
wherein:
said computers cooperate such that at least one of said computers computes from the data that is stored at least one of said computers a constant dollar to nominal dollar conversion for the private, constant dollar financial product and each of said computers respectively uses the data stored at the respective computer in generating different output for said private, constant dollar financial product.

99. The apparatus of claim 98, wherein one of said computers includes an investment-creating computer, and the output corresponding to the investment-creating computer comprises investment-creating documentation corresponding to said private, constant dollar financial product.

100. The apparatus of claim 98, wherein one of said computers includes an investment banker computer, and the output corresponding to the investment banker computer comprises investment banking documentation corresponding to said private, constant dollar financial product.

101. The apparatus of claim 98, wherein one of said computers includes a reporting computer, and the output corresponding to the reporting computer comprises reporting documentation corresponding to said private, constant dollar financial product.

102. The apparatus of claim 98, wherein one of said computers includes a rating agency computer, and the output corresponding to the rating computer comprises rating documentation corresponding to said private, constant dollar financial product.

103. The apparatus of claim 98, wherein one of said computers includes a trading computer, and the output corresponding to the trading computer comprises documentation corresponding to a trade of said private, constant dollar financial product.

104. The apparatus of claim 98, wherein one of said computers includes a broker computer, and the output corresponding to the broker computer comprises broker documentation corresponding to said private, constant dollar financial product.

105. The apparatus of claim 98, wherein one of said computers includes an investor computer, and the output corresponding to the investor computer comprises investor documentation corresponding to said private, constant dollar financial product.

106. The apparatus of claim 98, wherein one of said computers includes a servicing computer, and the output corresponding to the servicing computer comprises documentation corresponding to servicing said private, constant dollar financial product.

107. The apparatus of claim 98, wherein one of said computers includes an issuer computer, and the output corresponding to the issuer computer comprises documentation corresponding to issuing said private, constant dollar financial product.

108. The apparatus of claim 98, wherein one of said computers includes an accounting computer, and the output corresponding to the rating computer comprises documentation corresponding to accounting of said private, constant dollar financial product.

109. The apparatus of claim 98, wherein one of said computers includes a pension fund computer, and the output corresponding to the pension fund computer comprises documentation corresponding to associating a pension fund with said private, constant dollar financial product.

110. The apparatus of claim 98, wherein one of said computers includes an investment manager computer, and the output corresponding to the investment manager computer comprises investment management documentation corresponding to said private, constant dollar financial product.

111. The apparatus of claim 98, wherein one of said computers includes an investment company computer, and the output corresponding to the investment computer comprises documentation associating an investment company with said private, constant dollar financial product.

112. The apparatus of claim 98, wherein one of said computers includes an investment adviser computer, and the output corresponding to the investment advisor computer comprises investment advisor documentation corresponding to said private, constant dollar financial product.

113. The apparatus of claim 98, wherein one of said computers includes an insurance computer, and the output corresponding to the insurance computer comprises documentation associating insurance with said private, constant dollar financial product.

114. The apparatus of claim 98, wherein one of said computers includes a bank computer, and the output corresponding to the bank computer comprises documentation associating a bank with said private, constant dollar financial product.

115. The apparatus of claim 98, wherein one of said computers includes a clearing computer, and the output corresponding to the clearing computer comprises documentation corresponding to clearing said private, constant dollar financial product.

116. The apparatus of claim 98, wherein the financial product comprises a loan.

117. The apparatus of claim 98, wherein the financial product comprises a reverse loan.

118. The apparatus of claim 98, wherein the financial product comprises a mortgage.

119. The apparatus of claim 98, wherein the financial product comprises a vehicle loan.

120. The apparatus of claim 98, wherein the financial product comprises an aircraft loan.

121. The apparatus of claim 98, wherein the financial product comprises a construction loan.

122. The apparatus of claim 98, wherein the financial product comprises a bond.

123. The apparatus of claim 98, wherein the financial product comprises a tax exempt bond.

124. The apparatus of claim 98, wherein the financial product comprises a business loan.

125. The apparatus of claim 98, wherein the financial product comprises insurance.

126. The apparatus of claim 98, wherein the financial product comprises an annuity.

127. The apparatus of claim 98, wherein the financial product comprises a defined contribution plan.

128. The apparatus of claim 98, wherein the financial product comprises a defined benefit plan.

129. The apparatus of claim 98, wherein the financial product comprises a pension plan.

130. The apparatus of claim 98, wherein the financial product comprises currency.

131. The apparatus of claim 98, wherein the financial product comprises a futures contract.

132. The apparatus of claim 98, wherein the financial product comprises an options contract.

133. The apparatus of claim 98, wherein the financial product comprises a forward.

134. The apparatus of claim 98, wherein the financial product comprises a swap.

135. The apparatus of claim 98, wherein the financial product comprises a derivative.

136. The apparatus of claim 98, wherein the financial product comprises a debenture.

137. The apparatus of claim 98, wherein the financial product comprises a deposit.

138. The apparatus of claim 98, wherein the financial product comprises a note.

139. The apparatus of claim 98, wherein the financial product comprises a certificate of deposit.

140. The apparatus of claim 98, wherein the financial product comprises an investment company share.

141. The apparatus of claim 98, wherein the financial product comprises an asset-backed security.

142. The apparatus of claim 98, wherein the financial product comprises an international lending contract.

143. The apparatus of claim 98, wherein the financial product comprises a trust.

144. The apparatus of claim 98, wherein the financial product comprises a real estate investment trust.

145. The apparatus of claim 98, wherein the financial product comprises a real estate mortgage investment conduit.

146. The apparatus of any one of claims 1-19, 26-27, 30-49, 98-112, 114-115, 122-123, or 126-145, wherein the communications system is the Internet, and further comprising at least one communication over the Internet for carrying out said process.

147. The apparatus of one of claims 50-64, 66-67, 74-75, or 78-97, wherein the computers communicate over the Internet to facilitate a sale of the private, constant dollar financial product.

148. A computer apparatus including:
a first computer programmed to carry out steps including:
storing private, constant-dollar financial product data;
storing nominal dollar data corresponding to said private, constant-dollar financial product data;
a second computer programmed to carry out steps including:
storing said private, constant-dollar financial product data;
storing said nominal dollar data corresponding to said private, constant-dollar financial product data;
said computers communicating to enable cooperating such that at least one of the computers uses the data stored at said one of the computers in computing a constant dollar to nominal dollar conversion for the private, constant dollar financial product and each one of said computers generates different output respectively using additional data and said stored data at the corresponding one of said computers, said outputs including respective instrument documentation corresponding to the private, constant dollar financial product.

149. The apparatus of claim 148, wherein said instrument documentation is devoid of federal constant dollar instrument documentation.

150. The apparatus of any one of claims 1, 50-64, 66-67, 74-75, 78-98, 148, or 149 wherein said computers cooperate to facilitate a sale of said private, constant dollar financial product corresponding to said output of both said computers.

* * * * *